(12) United States Patent
Zhu

(10) Patent No.: US 12,482,020 B2
(45) Date of Patent: Nov. 25, 2025

(54) ADVERTISEMENT OBTAINING METHOD AND RELATED DEVICE THEREOF

(71) Applicant: Huawei Technologies Co., Ltd., Shenzhen (CN)

(72) Inventor: Zonglu Zhu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/557,832

(22) PCT Filed: Apr. 6, 2022

(86) PCT No.: PCT/CN2022/085371
§ 371 (c)(1),
(2) Date: Oct. 27, 2023

(87) PCT Pub. No.: WO2022/228063
PCT Pub. Date: Nov. 3, 2022

(65) Prior Publication Data
US 2024/0221034 A1 Jul. 4, 2024

(30) Foreign Application Priority Data
Apr. 30, 2021 (CN) .......................... 202110541452.0

(51) Int. Cl.
G06Q 30/0251 (2023.01)
G06Q 30/0241 (2023.01)

(52) U.S. Cl.
CPC ..... G06Q 30/0269 (2013.01); G06Q 30/0277 (2013.01)

(58) Field of Classification Search
CPC .......... G06Q 30/0269; G06Q 30/0277; G06Q 30/0251; G06F 8/61
See application file for complete search history.

(56) References Cited

U.S. PATENT DOCUMENTS

| 8,762,931 B2 * | 6/2014 | Vidal | G06F 8/65 717/121 |
| 9,785,974 B1 * | 10/2017 | Periasamy | G06Q 30/0267 |
| 2015/0193225 A1 * | 7/2015 | Brunsman | G06F 8/61 717/172 |
| 2017/0032420 A1 * | 2/2017 | Khilnani | G06Q 30/0261 |

FOREIGN PATENT DOCUMENTS

| CN | 110827056 A | 2/2020 | |
| CN | 112232848 A | 1/2021 | |
| JP | 2004530958 A * | 10/2004 | ............... G06F 9/54 |

* cited by examiner

Primary Examiner — Alexandru Cirnu
(74) Attorney, Agent, or Firm — Slater Matsil, LLP

(57) ABSTRACT

The method includes: A terminal device sends an advertisement request to an advertisement server, where the advertisement request includes information about a part or all of APPs installed on the terminal device; and the terminal device receives advertisement information sent by the advertisement server, where the advertisement information includes first advertisement information and/or second advertisement information, the first advertisement information is associated with a first APP installed on the terminal device, and the second advertisement information indicates the terminal device to install a second APP.

18 Claims, 24 Drawing Sheets

| Advertisement delivery type | Official delivery | Trial delivery |

Promoted product details

| Promoted application ID | Q Jingdong (C184981) ∧ |

Format: Cxxxxxxxx, please check in a page of Huawei AppGallery, for example: https://appgallery.hauwei.com/app/Cxxxxxxxx

Targeting

New Targeting

| Region | Unlimited | Chinese mainland | Custom geographic location |

| Gender | Unlimited | Male | Female |

| Age | Unlimited | Over 18 years old | 18 to 23 years old | 24 to 34 years old | 35 to 44 years old | 45 to 54 years old | 55 years and over |

| APP installation | Installed | Uninstalled |

| APP behavior | Unlimited | Custom |

| Device | Unlimited | Sorted by brand | Sorted by price |

| Networking manner | Unlimited | Wi-Fi | 2G | 3G | 4G | 5G |

FIG. 4

ADVERTISEMENT OBTAINING METHOD AND RELATED DEVICE THEREOF

CROSS-REFERENCE TO RELATED APPLICATIONS

This application is a national stage of International Application No. PCT/CN2022/085371, filed on Apr. 6, 2022, which claims priority to Chinese Patent Application No. 202110541452.0 filed on Apr. 30, 2021. Both of the aforementioned applications are hereby incorporated by reference in their entireties.

TECHNICAL FIELD

This application relates to the communication field, and more specifically, to an advertisement obtaining method and a related device thereof.

BACKGROUND

Currently, to further increase penetration and utilization of various applications (applications, APPs) in the market, APP maintenance parties push advertisements about the APPs to users.

For an APP, there are two application installation states of the APP on a terminal device used by a user: an installed state and an uninstalled state. In an advertisement delivery process, an advertiser may encounter inaccurate advertisement delivery. For example, some advertisements expect users to download the APP through the advertisements and need to be delivered to users who do not install the APP, to increase penetration of the APP, but the advertisements are delivered to users who have installed the APP; and some advertisements need to be delivered to users who have installed the APP, to increase penetration of the APP, but the advertisements are delivered to users who do not install the APP. In this case, advertisement delivery efficiency is reduced.

SUMMARY

This application provides an advertisement obtaining method and a related device thereof. An advertisement server determines, based on APPs installed on a terminal device, an APP list stored on the advertisement server, and an APP installation state targeting condition of each advertisement that needs to be delivered, an advertisement that satisfies the targeting condition, for delivery. In this way, accuracy of application installation state targeting is ensured, and delivery efficiency of an advertisement with application installation state targeting is improved.

According to a first aspect, an advertisement obtaining method is provided. The method includes: A terminal device sends an advertisement request to an advertisement server, where the advertisement request includes information about an application (APP) set, and the application set includes a part or all of applications installed on the terminal device; and the terminal device receives advertisement information sent by the advertisement server in response to the advertisement request, where the advertisement information includes first advertisement information and/or second advertisement information, the first advertisement information is associated with a first application, the application set includes the first application, the second advertisement information indicates the terminal device to install a second application, and the application set does not include the second application.

According to the method provided in the first aspect, the terminal device reports a list of APPs installed on the terminal device, and the advertisement server determines, based on the list of APPs installed on the terminal device and an APP installation state targeting condition of each advertisement that needs to be delivered, an advertisement that satisfies the targeting condition, for delivery. In this way, regardless of whether the advertisement request sent by a user carries an advertisement tracking identifier, accuracy of application installation state targeting can be ensured, thereby ensuring delivery accuracy of an advertisement with application installation state targeting, and improving delivery efficiency of an advertisement with application installation state targeting.

For example, the application installation state targeting means that an APP is in an installed state, or the APP is in an uninstalled state. In other words, the application installation state targeting may be understood as an installation state of an APP determined on the terminal device. For an APP, the APP installation state targeting is that the APP is in an installed state, or the APP is in an uninstalled state.

An advertisement with application installation state targeting refers to application installation state targeting set by (or corresponding to) an advertisement. In other words, an advertisement with application installation state targeting may be understood as that the advertisement needs to be delivered to users who have installed one or more specific APPs, or the advertisement needs to be delivered to users who do not install one or more specific APPs.

In a possible implementation of the first aspect, the information about the application set includes an application package name.

For example, a package name of a Jingdong APP is com.jingdong.app.mall.

In a possible implementation of the first aspect, the information about the application set includes a short encoding result and a short encoding mode identifier that correspond to each application package name. In this implementation, because the advertisement request sent by the terminal device carries only the short encoding result and the short encoding mode identifier that correspond to each application package name, and does not need to carry a large quantity of application package names, excessive consumption of user traffic is avoided and then a delay of the advertisement request is reduced, thereby increasing an advertisement display rate, improving delivery efficiency of an advertisement with application installation state targeting, and improving user experience.

For example, the short encoding modes include all encoding modes that can reduce a length of a character that needs to be encoded, that is, a length of a character before encoding is greater than a length of the character after encoding.

In a possible implementation of the first aspect, before the terminal device sends the advertisement request to the advertisement server, the method further includes: The terminal device sends a query request to the advertisement server, where the query request includes the applications installed on the terminal device; and the terminal device receives query response information sent by the advertisement server, where the query response information includes the information about the application set. In this implementation, storage resources of the advertisement server may be saved, it is guaranteed that the advertisement server can work normally, and working efficiency of the advertisement server is ensured.

For example, the application set is an intersection of the applications installed on the terminal device and applications stored in the advertisement server. The applications stored in the advertisement server are associated with advertisements that need to be delivered by the advertisement server. In this implementation, the user periodically reports the APPs installed on the terminal device, and the advertisement server obtains, based on the APPs installed on the terminal device and an APP list stored on the advertisement server, an APP intersection of the APPs installed on the terminal device and the APP list stored on the advertisement server, and sends the APP intersection to the terminal device. In this way, accuracy of application installation state targeting is ensured, thereby ensuring delivery accuracy of an advertisement with application installation state targeting. In addition, a delay of the advertisement request of the user can also be reduced, thereby increasing an advertisement display rate and improving delivery efficiency of an advertisement with application installation state targeting.

For example, the terminal device may send the query request to an APP list service module each time after the terminal device is powered on, or after each detection that a new APP is downloaded and installed, or periodically (for example, every one day or two days). Alternatively, the terminal device may further determine, based on a current network state of the terminal device (for example, a connected network type (Wi-Fi/local area network/cellular network) or a network speed), an occasion for sending the query request.

In a possible implementation of the first aspect, the first advertisement information includes a download address of a first advertisement material, a package name of the first application, and an address link of a first page, and the first page is a page of the first application; and/or the second advertisement information includes a download address of a second advertisement material and a package name of the second application.

In a possible implementation of the first aspect, the method further includes: The terminal device displays a first interface, where the first interface includes the first advertisement material; the terminal device detects a first operation performed on a first advertisement; and the terminal device displays the first page in the first application when the first operation is detected.

In a possible implementation of the first aspect, the method further includes: The terminal device displays a second interface, where the second interface includes the second advertisement material; the terminal device detects a second operation performed on a second advertisement; and the terminal device displays a download page of the second application when the second operation is detected.

In a possible implementation of the first aspect, before the terminal device sends the advertisement request to the advertisement server, the method further includes: The terminal device receives a third operation of a user. The third operation is used to trigger the terminal device to send the advertisement request, and the third operation includes an operation of opening an application or an operation of tapping a link in an application.

For example, the third operation may include: The user opens an APP (for example, a Huawei Video APP) on the terminal device, or enters an interface specified by an APP, or after opening a video APP on the terminal device, the user taps a displayed video, or in a video play process, sending of the advertisement request is triggered when a pause operation of the user is detected. Alternatively, the user opens an APP (for example, a shopping APP) on the terminal device, or the user taps a link in an APP (for example, a shopping APP) to open a commodity interface. When the APP on the terminal device detects any one of these operations, the terminal device is triggered to generate an advertisement request and send the advertisement request.

For example, the advertisement request may also be automatically triggered in a running process of an APP on the terminal device. The user only needs to open an APP, and then, during running, the APP can automatically trigger sending of the advertisement request.

According to a second aspect, an advertisement obtaining method is provided. The method is applied to an advertisement system, the system includes a terminal device and an advertisement server, and the method includes: The terminal device sends an advertisement request to the advertisement server, where the advertisement request includes information about an application set, and the application set includes a part or all of applications installed on the terminal device; the advertisement server determines, based on the advertisement request and an advertisement with application installation targeting, an advertisement that satisfies a delivery condition, where the advertisement with application installation targeting includes an advertisement targeted to users who have installed an application, and/or an advertisement targeted to users who have not installed an application; and the advertisement server sends advertisement information to the terminal device in response to the advertisement request, where the advertisement information includes first advertisement information and/or second advertisement information, the first advertisement information is associated with a first application, the application set includes the first application, the second advertisement information indicates the terminal device to install a second application, and the application set does not include the second application.

According to the method provided in the second aspect, the terminal device reports installed APPs, and the advertisement server determines, based on the APPs installed on the terminal device and an APP installation state targeting condition of each advertisement that needs to be delivered, an advertisement that satisfies the targeting condition, for delivery. In this way, regardless of whether the advertisement request sent by a user carries an advertisement tracking identifier, accuracy of application installation state targeting can be ensured, thereby ensuring delivery accuracy of an advertisement with application installation state targeting, and improving delivery efficiency of an advertisement with application installation state targeting.

In a possible implementation of the second aspect, the information about the application set includes an application package name.

In a possible implementation of the second aspect, the information about the application set includes a short encoding result and a short encoding mode identifier that correspond to each application package name.

In a possible implementation of the second aspect, before the terminal device sends the advertisement request to the advertisement server, the method further includes: The terminal device sends a query request to the advertisement server, where the query request includes the applications installed on the terminal device; the advertisement server determines the application set based on the applications installed on the terminal device and applications stored in the advertisement server; the advertisement server obtains the information about the application set based on the application set; and the advertisement server sends the information about the application set to the terminal device. In this implementation, an APP list service module in the advertisement server sends the APP set to the terminal device used by the user. In this way, storage resources of the advertisement server may be saved, it is guaranteed that the advertisement server can work normally, and working efficiency of the advertisement server is ensured.

In a possible implementation of the second aspect, the application set is an intersection of the applications installed on the terminal device and the applications stored in the advertisement server. The applications stored in the advertisement server are associated with advertisements that need to be delivered by the advertisement server. In this implementation, the user periodically reports APPs installed on the used terminal device, and the advertisement server obtains, based on the APPs installed on the terminal device and the APP list stored on the advertisement server, an APP intersection of the APPs installed on the terminal device and the APP list stored on the advertisement server. When the terminal device requests an advertisement, the APP intersection is carried. The advertisement server determines, based on the APP intersection and an APP installation state targeting condition of each advertisement that needs to be delivered, an advertisement that satisfies the targeting condition, for delivery. In this way, delivery accuracy of an advertisement with application installation state targeting is ensured, and delivery efficiency of an advertisement with application installation state targeting is improved.

In a possible implementation of the second aspect, if the information about the application set includes the short encoding result and the short encoding mode identifier that correspond to each application package name, that the advertisement server obtains the information about the application set based on the application set includes: The advertisement server performs, based on the application set by using a short encoding mode, short encoding on each application package name included in the application set, to obtain the short encoding result that corresponds to each application package name; and the advertisement server obtains the information about the application set based on the short encoding result that corresponds to each application package name and the short encoding mode.

For example, the short encoding modes include all encoding modes that can reduce a length of a character that needs to be encoded, that is, a length of a character before encoding is greater than a length of the character after encoding.

In a possible implementation of the second aspect, before the advertisement server determines the advertisement that satisfies the delivery condition, the method further includes: The advertisement server determines a corresponding decoding mode based on the short encoding mode identifier; and the advertisement server decodes, based on the decoding mode, the short encoding result that corresponds to each application package name, to obtain the application set.

In a possible implementation of the second aspect, the first advertisement information includes a download address of an advertisement material, a package name of the first application, and an address link of a first page, and the first page is a page of the first application; and/or the second advertisement information includes a download address of a second advertisement material and a package name of the second application.

In a possible implementation of the second aspect, the method further includes: The terminal device displays a first interface, where the first interface includes the first advertisement material; the terminal device detects a first operation performed on a first advertisement; and the terminal device displays the first page in the first application when the first operation is detected.

In a possible implementation of the second aspect, the method further includes: The terminal device displays a second interface, where the second interface includes the second advertisement material; the terminal device detects a second operation performed on a second advertisement; and the terminal device displays a download page of the second application when the second operation is detected.

In a possible implementation of the second aspect, before the terminal device sends the advertisement request to the advertisement server, the method further includes: The terminal device receives a third operation of a user. The third operation is used to trigger the terminal device to send the advertisement request, and the third operation includes an operation of opening an application or an operation of tapping a link in an application.

According to a third aspect, a communication apparatus is provided. The communication apparatus includes a unit configured to perform the steps in any one of the first aspect or the possible implementations of the first aspect.

According to a fourth aspect, a communication apparatus is provided. The communication apparatus includes at least one processor and a memory. The processor is coupled to the memory, the memory stores program instructions, and when the program instructions stored in the memory are executed by the processor, the method in any one of the first aspect or the possible implementations of the first aspect is performed.

According to a fifth aspect, a communication apparatus is provided. The communication apparatus includes at least one processor and an interface circuit. The at least one processor is configured to perform the method in any one of the first aspect or the possible implementations of the first aspect.

According to a sixth aspect, a terminal device is provided. The terminal device includes any communication apparatus provided in the third aspect, the fourth aspect, or the fifth aspect.

According to a seventh aspect, a communication apparatus is provided. The communication apparatus includes at least one processor and a memory. The processor is coupled to the memory, the memory stores program instructions, and when the program instructions stored in the memory are executed by the processor, the method performed by the advertisement server in any one of the second aspect or the possible implementations of the second aspect is performed.

According to an eighth aspect, a communication apparatus is provided. The communication apparatus includes a unit configured to perform the steps performed by the advertisement server in any one of the second aspect or the possible implementations of the second aspect.

According to a ninth aspect, a communication apparatus is provided. The communication apparatus includes at least one processor and an interface circuit. The at least one processor is configured to perform the method performed by the advertisement server in any one of the second aspect or the possible implementations of the second aspect.

According to a tenth aspect, an advertisement server is provided. The advertisement server includes any communication apparatus provided in the seventh aspect, the eighth aspect, or the ninth aspect.

According to an eleventh aspect, a computer program product is provided. The computer program product includes a computer program. When the computer program is executed by a processor, the computer program is configured to perform the method in any one of the first aspect or the possible implementations of the first aspect, or is configured to perform the method in any one of the second aspect or the possible implementations of the second aspect.

According to a twelfth aspect, a computer-readable storage medium is provided. The computer-readable storage medium stores a computer program. When the computer program is executed, the computer program is configured to perform the method in any one of the first aspect or the possible implementations of the first aspect, or is configured to perform the method in any one of the second aspect or the possible implementations of the second aspect.

According to a thirteenth aspect, a chip is provided. The chip includes a processor, configured to invoke a computer program from a memory and run the computer program, to enable a communication device in which the chip is installed to perform the method in any one of the first aspect or the possible implementations of the first aspect, or perform the method in any one of the second aspect or the possible implementations of the second aspect.

According to the advertisement obtaining method and the related device that are provided in this application, a user periodically reports APPs installed on a terminal device, and an advertisement server obtains, based on the APPs installed on the terminal device and an APP list stored on the advertisement server, an APP intersection of the APPs installed on the terminal device and the APP list stored on the advertisement server, and sends the APP intersection to the terminal device. When the terminal device requests an advertisement, the APP intersection is carried. The advertisement server determines, based on the APP intersection and an APP installation state targeting condition of each advertisement that needs to be delivered, an advertisement that satisfies the targeting condition, for delivery. In this way, regardless of whether the advertisement request sent by the user carries an advertisement tracking identifier, accuracy of application installation state targeting can be ensured, thereby ensuring delivery accuracy of an advertisement with application installation state targeting. In addition, a delay of the advertisement request of the user can also be reduced, thereby increasing an advertisement display rate, improving delivery efficiency of an advertisement with application installation state targeting, and improving user experience.

BRIEF DESCRIPTION OF THE DRAWINGS

FIG. 4 is a schematic interface diagram of an example of creating, by an advertiser on an advertising platform, an advertisement with application installation state targeting according to this application;

DETAILED DESCRIPTION OF THE EMBODIMENTS

Figure 1:
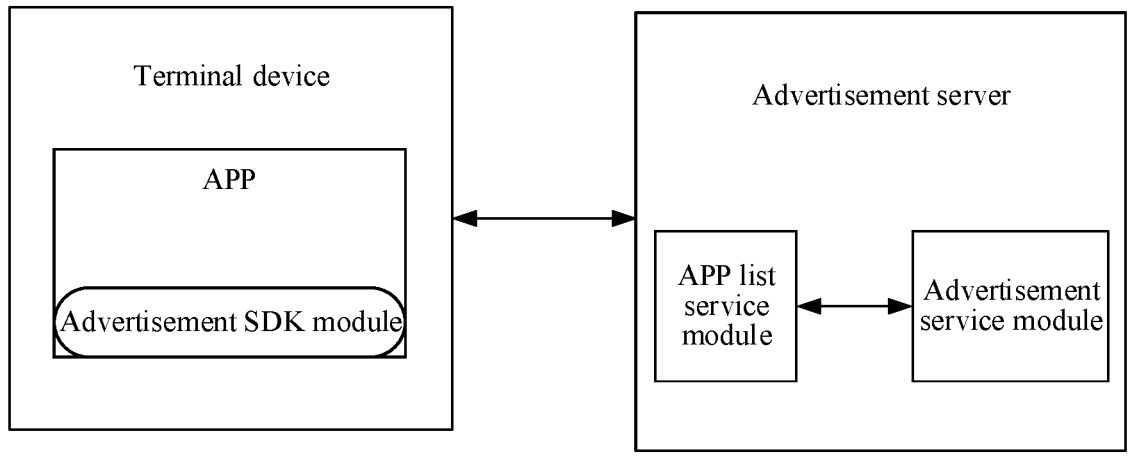
FIG. 1 is a schematic diagram of an example of a communication system architecture applicable to an embodiment of this application.

The following describes technical solutions of this application with reference to the accompanying drawings.

In the descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases. Only A exists, both A and B exist, and only B exists. In addition, in the descriptions of embodiments of this application, "a plurality of" means two or more.

The terms "first" and "second" mentioned below are merely intended for a purpose of description, and shall not be understood as indicating or implicating relative importance or implicating an indication of a quantity of indicated technical features. Therefore, a feature limited by "first" or "second" may explicitly or implicitly include one or more features. In the descriptions of embodiments, unless otherwise specified, "a plurality of" means two or more.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory (for example, an erasable programmable read-only memory (erasable programmable read-only memory, EPROM), a card, a rod, or a key drive). In addition, various storage media described in this specification may represent one or more devices and/or other machine-readable media that are configured to store information. The term "machine-readable media" may include but is not limited to a radio channel, and various other media that can store, include and/or carry instructions and/or data.

The technical solutions of embodiments of this application may be applied in various communication systems, for example, a global system for mobile communications (Global System for Mobile communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS) system, a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a worldwide interoperability for microwave access (Worldwide Interoperability for Microwave Access, WiMAX) communication system, a $5^{th}$ generation ($5^{th}$ Generation, 5G) system, or a new radio (New Radio, NR) system.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory (for example, an erasable programmable read-only memory (erasable programmable read-only memory, EPROM), a card, a rod, or a key drive). In addition, various storage media described in this specification may represent one or more devices and/or other machine-readable media that are configured to store information. The term "machine-readable media" may include but is not limited to a radio channel, and various other media that can store, include and/or carry instructions and/or data.

To further improve penetration (promotion to acquire new users of an APP) and utilization (a frequency of using an APP by an old user of the APP) of various APPs in the market, a maintenance party of an APP may push an advertisement about the APP to a user. For example, a maintenance party of a shopping APP delivers an advertisement about the shopping APP on an advertising platform of the maintenance party, or delivers an advertisement about the shopping APP on another advertising platform (for example, Huawei).

For an APP, there are two application installation states of the APP on a terminal device used by a user. One is an installed state, that is, the APP is installed on the terminal device of the user. The other is an uninstalled state, that is, the APP is not installed on the terminal device of the user.

Because the application (or APP) installation states include the installed state and the uninstalled state, application installation state targeting means that an APP is in an installed state or the APP is in an uninstalled state. In other words, the application installation state targeting may be understood as an installation state of an APP determined on the terminal device. For an APP, the APP installation state targeting is that the APP is in an installed state, or the APP is in an uninstalled state.

An advertisement with application installation state targeting (or may be referred to as an advertisement having application installation state targeting) refers to application installation state targeting set by (or corresponding to) an advertisement. In other words, an advertisement with application installation state targeting may be understood as that the advertisement needs to be delivered to users who have installed one or more specific APPs, or the advertisement needs to be delivered to users who do not install one or more specific APPs. For example, for an advertisement promoting a "Huawei Video APP", a targeting condition set for the advertisement is users who do not install the "Huawei Video" APP, and the advertisement is an advertisement with application installation state targeting.

If an advertiser (or may also be referred to as an advertising placer, an APP maintenance party, or the like) delivers an advertisement to perform application user attraction, which may be understood as promotion to attract new users of an APP, a target user group is generally users who do not install the APP, and then the advertisement delivered by the advertiser is targeted to users who do not install the APP. If an advertiser delivers an advertisement to perform application activation. The application activation may be understood as a promotion activity on an APP, a target user group is generally users who have installed the APP, and the advertisement delivered by the advertiser is targeted to users who have installed the APP.

It should be understood that, in embodiments of this application, a user who has installed an APP or a user who does not install an APP means that an APP is installed or an APP is not installed on a terminal device used by the user. In other words, the user who has installed an APP or the user who does not install an APP may be understood as a terminal device on which an APP has been installed or a terminal device on which an APP is not installed.

Currently, for an advertisement with application installation state targeting, big data platforms owned by general advertisers all have a capability of making a user grouping tag. To be specific, users are classified into users who have installed one or more APPs and users who do not install one or more APPs. For example, a specific APP is a Taobao APP. It is assumed that an advertiser wants to deliver an advertisement for a purpose of acquiring new users of the Taobao APP (that is, a target user group of the delivered advertisement is users who do not install the Taobao APP). The advertiser may obtain, from a user grouping tag, "group of users who have installed the Taobao APP" based on the user grouping tag. When receiving an advertisement request sent by a user through a terminal, the advertiser queries, based on an advertisement tracking identifier (for example, a Google advertising identifier (Google advertising identifier, GAID) or an open anonymous device identifier (open anonymous device identifier, OAID)) carried in the advertisement request, whether the user is in the "group of users who have installed the Taobao APP". If the user is in the group, the advertisement cannot be delivered. If the user is not in the group, the advertiser can deliver the advertisement to the user.

However, in the case of using the foregoing solution, if the user sets to restrict advertisement tracking, the advertiser cannot obtain the advertisement tracking identifier in the advertisement request sent by the user, that is, the advertiser is restricted from using the advertisement tracking identifier of the user. The advertiser cannot use the user grouping tag, therefore, the advertiser cannot implement application installation state targeting during advertisement delivery. In this way, advertisement delivery efficiency is severely reduced. In addition, data concerning the "group of uses who have installed an application" classified and collected by the advertiser may be inaccurate. As a result, application installation state targeting may be inaccurate, and delivery accuracy of an advertisement with application installation state targeting is reduced.

In view of this, this application provides an advertisement obtaining method. A user periodically reports APPs installed on a used terminal device, and an advertisement server obtains, based on the APPs installed on the terminal device and an APP list stored on the advertisement server, an APP intersection of the APPs installed on the terminal device and the APP list stored on the advertisement server. When the terminal device requests an advertisement, the APP intersection is carried. The advertisement server determines, based on the APP intersection and an APP installation state targeting condition of each advertisement that needs to be delivered, an advertisement that satisfies the targeting condition, for delivery. In this way, regardless of whether the advertisement request sent by a user carries an advertisement tracking identifier, accuracy of application installation state targeting can be ensured, thereby ensuring delivery accuracy of an advertisement with application installation state targeting, and improving delivery efficiency of an advertisement with application installation state targeting.

The following describes an advertisement obtaining method provided in this application with reference to specific examples.

FIG. 1 is a schematic diagram of an example of a communication system architecture applicable to an embodiment of this application. As shown in FIG. 1, the communication system includes a terminal device used by a user and an advertisement server used by an APP maintenance party. The APP maintenance party uses the advertisement server to deliver an advertisement related to an APP to the user. For example, a maintenance party of a Taobao APP (Alibaba) may deliver an advertisement related to the Taobao APP to a user in an advertisement server maintained by the maintenance party, or may deliver an advertisement related to the Taobao APP to a user in an advertisement server maintained by Huawei, or may deliver an advertisement related to the Taobao APP to a user in an advertisement server maintained by Baidu.

A plurality of APPs are installed on the terminal device, and advertising software development kit (software development kit, SDK) modules are integrated onto the plurality of APPs. The advertisement server includes an APP list service module and an advertisement service module. Advertisement SDKs on the terminal device are mainly provided for APP integration and provide services such as an advertising related request, play, and event reporting. The APP list service module in the advertisement server is mainly configured to obtain an intersection between a list of APPs installed by the user and that is reported by the advertisement SDK modules and an APP list stored on the advertisement server, and return the APP intersection to the advertisement SDK modules. The advertisement service module in the advertisement server is mainly configured to provide a requested advertisement service.

In the example shown in FIG. 1, data and information may be communicated between the terminal device and the advertisement server by using an LTE communication technology, a 5G communication technology, or the like. This is not limited herein in embodiments of this application.

Figure 2:
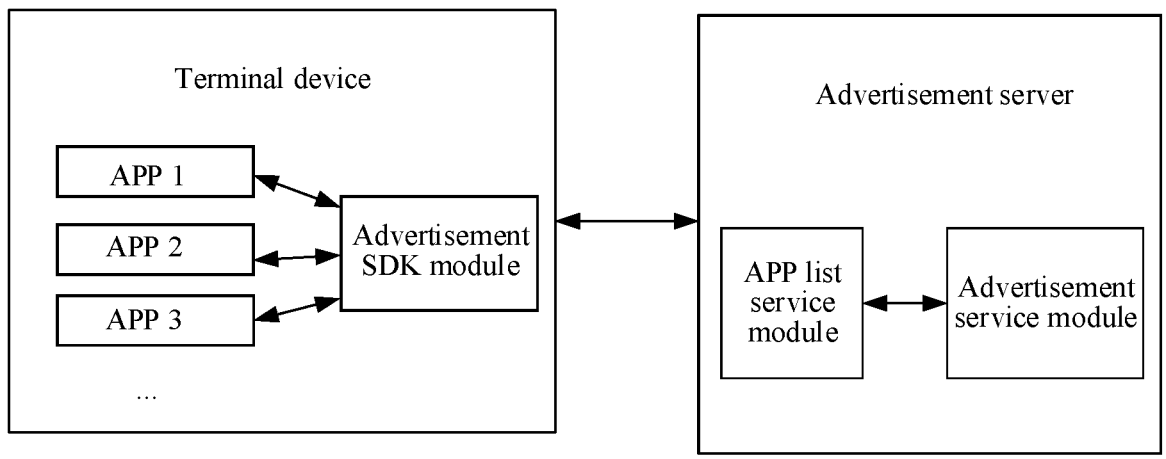
FIG. 2 is a schematic diagram of another example of a communication system architecture applicable to an embodiment of this application.

FIG. 2 is a schematic diagram of another example of a communication system architecture applicable to an embodiment of this application. As shown in FIG. 2, the communication system includes a terminal device used by a user and an advertisement server used by an APP maintenance party. A plurality of APPs are installed on the terminal device, and an advertisement SDK module is integrated on the terminal device, that is, the advertisement SDK module is not integrated into the APPs, but is integrated into a system of the terminal device. The advertisement SDK module may interact with the plurality of APPs to obtain information about the APPs installed on the terminal device. The advertisement server includes an APP list service module and an advertisement service module.

In the scenarios shown in FIG. 1 and FIG. 2, an advertisement resource pool is maintained in the advertisement server (for example, in the advertisement service module). The advertisement resource pool stores advertisement materials (for example, text, a picture, a video, and a sound that appear in an advertisement) and advertisement information (for example, an advertisement name, an advertisement type, and an advertisement material link address) uploaded by various advertisers. Advertisements maintained in the advertisement resource pool include an advertisement with application installation state targeting.

The advertisement information is a description parameter used to indicate a feature attribute of a to-be-played advertisement, for example, an ID of the advertisement, the name, the advertisement type, and the advertisement material link address. This is not limited in embodiments of this application.

Correspondingly, the advertisement material is specific advertisement content to be displayed on a display screen of the terminal device, for example, the text, the picture, the video, and the sound that appear in the advertisement. This is not limited in embodiments of this application either.

It may be understood that the system architectures shown in FIG. 1 and FIG. 2 do not constitute a specific limitation on the system architectures of the terminal device and the advertisement server. In some other embodiments of this application, a system architecture of a terminal device and an advertisement server may include more or fewer units or modules than those shown in the figures, or combine some units, or split some units, or different component units. The units shown in the figures may be implemented by hardware, software, or a combination of software and hardware. This is not limited herein in embodiments of this application.

Figure 3:
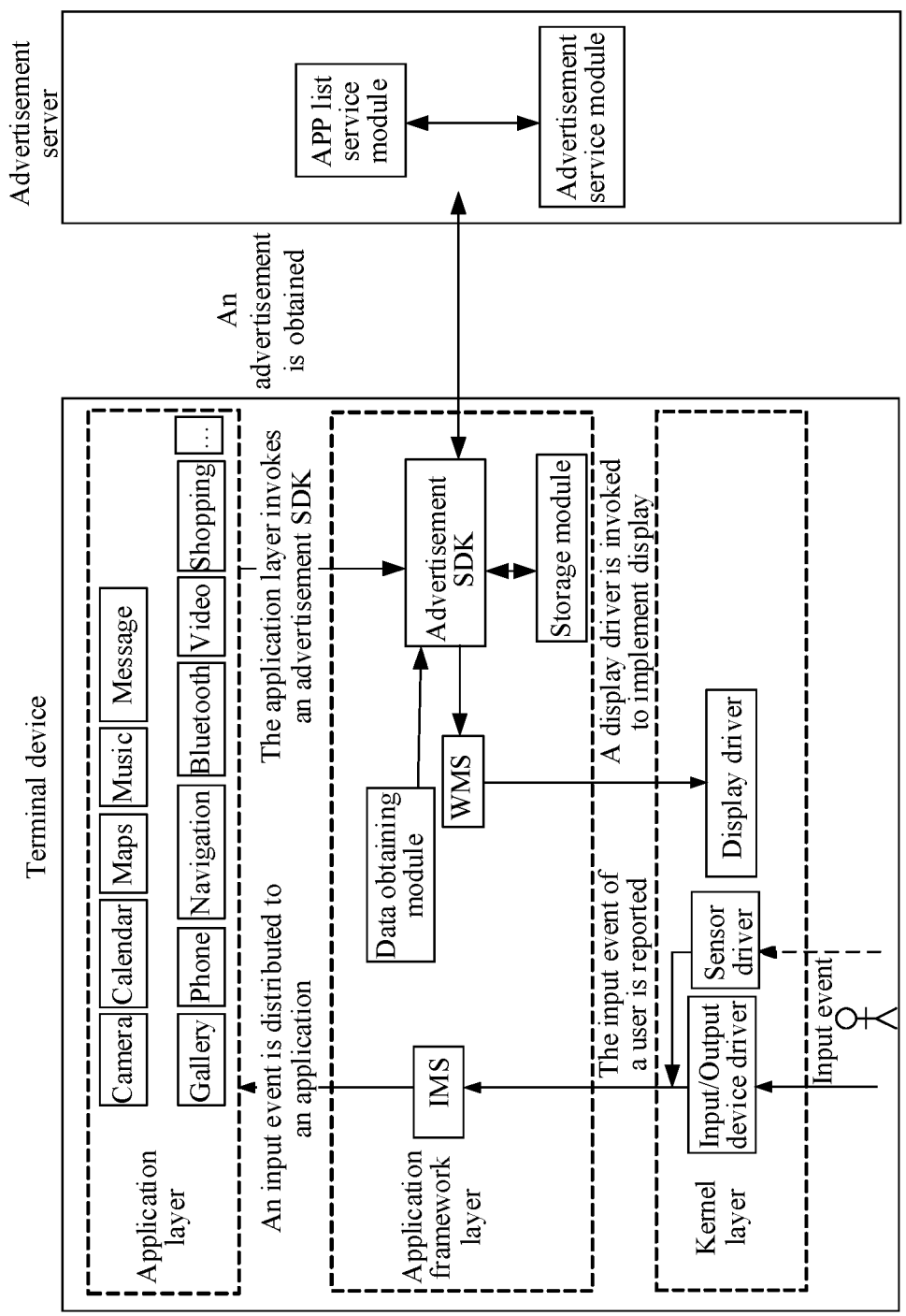
FIG. 3 is a schematic diagram of an example of a software interaction when a terminal device requests an advertisement from an advertisement server in an Android (Android) operating system with a layered architecture.

FIG. 3 specifically introduces a schematic diagram of an example of a software interaction when a terminal device requests an advertisement from an advertisement server according to an embodiment of this application by using an Android (Android) operating system with a layered architecture as an example. A layered architecture can divide software into several layers, and each of the layers has a clear role and task. The layers communicate with each other through a software interface. As shown in FIG. 3, a software structure of the terminal device may be divided into three layers from top to bottom: an application layer (application layer for short), an application framework layer (framework layer for short), and a system library, Android runtime and kernel layer (also referred to as a driver layer).

The application layer may include a series of application packages, for example, applications such as Camera, Gallery, Calendar, Phone, Maps, Navigation, WLAN, Bluetooth, Music, Video, Shopping APP, Message, and Desktop Launcher (Launcher). For ease of description, an application is briefly referred to as an APP (that is, APP) below. An application on the terminal device may be a native application (for example, an application installed on the terminal device when an operating system is installed before the terminal device is delivered from a factory), or may be a third-party application (for example, an application downloaded and installed by a user by using an application store). This is not limited in this embodiment of this application.

The application framework layer provides an application programming interface (application programming interface, API) and a programming framework for an application in the application layer. As shown in FIG. 3, the application framework layer may include a window manager service (window manager service, WMS), an input event manager service (input event manager service, IMS), and an advertisement SDK module. In some embodiments, the application framework layer may further include a content provider, a view system, a phone manager, a resource manager, a notification manager, and the like (not shown in FIG. 3).

The WMS carries data and an attribute related to an "interface", and is configured to manage a state related to the "interface". For example, the WMS is configured to manage a window program and an event dispatch. The managing a window program refers to sequentially outputting to a physical screen or another display device based on a display request of an application under assistance of an application server and the WMS. The event dispatch refers to dispatching user events from a keyboard, a physical key, a touchscreen, a mouse, and a trackball (TraceBoll) to a corresponding control or window.

The IMS may be configured to perform processing such as translation and encapsulation on an original input event, to obtain an input event including more information, and send the input event to the WMS. The WMS stores a tappable area of each application (for example, a control), location information of a focus window, and the like. Therefore, the WMS can correctly distribute the input event to a specified control or focus window.

The advertisement SDK module is mainly configured to provide services such as an advertising related request, play, and event reporting. An APP list service module in the advertisement server is mainly configured to obtain an intersection between a list of APPS installed by the user and that is reported by the advertisement SDK module and an APP list stored on the advertisement server, and return the APP intersection to the advertisement SDK module. An advertisement service module in the advertisement server is mainly configured to provide a requested advertisement service.

The system library and the Android runtime include a functional function that needs to be invoked by an FWK, an Android core library, and an Android virtual machine. The system library may include a plurality of functional modules, for example, a browser kernel, a three-dimensional (3 dimensional, 3D) graphic, and a font library.

The system library may include a plurality of functional modules, for example, a surface manager (surface manager), a media library (Media Library), a three-dimensional graphic processing library (for example, OpenGL ES), and a 2D graphic engine (for example, SGL).

The kernel layer is a layer between hardware and software. The kernel layer may include a display driver, an input/output device driver (for example, a keyboard, a touchscreen, a headset, a speaker, or a microphone), a device node, a camera driver, an audio driver, a sensor driver, and the like. A user performs an input operation by using an input device. The kernel layer may generate a corresponding original input event based on the input operation, and store the original input event in the device node. The input/output device driver can detect the input event of the user. For example, the user starts an application.

In this embodiment of this application, in a process in which the terminal device requests an advertisement from the advertisement server, an input/output device driver or a sensor driver of the terminal device may detect an input event of a user. For example, the input event may be an input event in which the user taps a button on an APP interface to enter a next-level interface of the APP interface. The input/output device driver or the sensor driver of the terminal device reports the input event of the user to the IMS. The MS distributes the input event to a corresponding application. The application invokes the advertisement SDK module. The advertisement SDK module invokes a data obtaining module to obtain an APP list intersection installed on the terminal device. The APP list intersection is an intersection of APPS installed on the terminal device and the APP list stored on the advertisement server. The advertisement service module determines, based on the APP list intersection, the list of APPS installed on the terminal device; determines, based on the list of APPs installed by the user and a targeting requirement of an advertisement, an advertisement that satisfies a delivery condition; and sends the advertisement to the advertisement SDK module. The advertisement SDK module sends advertisement information to the WMS. The WMS re-invokes the display driver on the terminal device, to synchronously display an advertisement that needs to be delivered on the display screen of the terminal device.

It should be noted that FIG. 3 introduces a schematic diagram of a software interaction when a terminal device requests an advertisement from an advertisement server by using only an Android system with a layered architecture as an example. Specific architectures of the terminal device and the advertisement server software system are not limited in this application. For a specific description of a software system of another architecture, refer to a conventional technology.

The terminal device in embodiments of this application may also refer to a user equipment, an access terminal, a subscriber unit, a subscriber station, a mobile station, a remote station, a remote terminal, a mobile device, a user terminal, a terminal, a wireless communication device, a user agent, a user apparatus, or the like. The terminal device may alternatively be a cellular phone, a cordless phone, a Session Initiation Protocol (Session Initiation Protocol, SIP) phone, a wireless local loop (Wireless Local Loop, WLL) station, a personal digital processing (Personal Digital Assistant, PDA), a handheld device with a wireless communication function, a computing device, another processing device connected to a wireless modem, a vehicle-mounted device, a wearable device, a terminal device in a 5G network, a terminal device in a future evolved public land mobile communications network (public land mobile network, PLMN), or the like. This is not limited in embodiments of this application.

For example, the terminal device in embodiments of this application may be a smartphone, a smart television, a tablet computer, a netbook, a PDA, a computer handheld communication device, a handheld computing device, a smart band, a smartwatch, a wearable wrist device, smart glasses, or the like. This is not limited herein in embodiments of this application.

FIG. 4 is a schematic interface diagram of an example in which an advertiser creates, on an advertising platform, an advertisement with application installation state targeting according to this application. The advertiser may create an advertisement task on the interface. As shown in FIG. 4, the advertiser may select or enter, in a menu bar of "Promoted Application ID", an APP that needs to be targeted by an advertisement, for example, a "Jingdong APP". After the selection, targeting conditions required for the advertisement can be selected by a "New Targeting" menu bar. For example, the targeting conditions required for the advertisement include: a region that needs to the targeted by the advertisement, a gender of a user, an age of the user, whether the "APP" has been installed, a behavior of the "APP", sorting of a device that requires delivery, a networking manner of the device that requires delivery, and the like. The advertiser may select one or more of these targeting conditions. For example, it is assumed that the advertiser selects: the "Jingdong APP" has been installed. The advertisement then targets and is delivered to users who have installed the "Jingdong APP". If the advertiser selects a plurality of conditions from the targeting conditions, the advertisement targets and is delivered to users who satisfy the plurality of conditions. After selecting the targeting condition, the advertiser may input information about the selected targeting condition and information about the advertisement into an advertisement server, and the advertisement server may deliver, based on the targeting condition of the advertisement, the advertisement to users who satisfy the targeting condition.

It may be understood that the schematic interface diagram shown in FIG. 4 does not constitute any limitation on an interface diagram of creating the advertisement task by the advertiser. In some other embodiments of this application, an interface diagram of creating an advertisement task by an advertiser may include more or fewer elements than those shown in FIG. 4, or combine some elements, or split some elements, or different elements, or the like. For example, the interface diagram may include other targeting conditions more than the targeting conditions shown in FIG. 2. This is not limited herein in embodiments of this application.

The following describes an advertisement obtaining method provided in this application with reference to specific examples.

Figure 5:
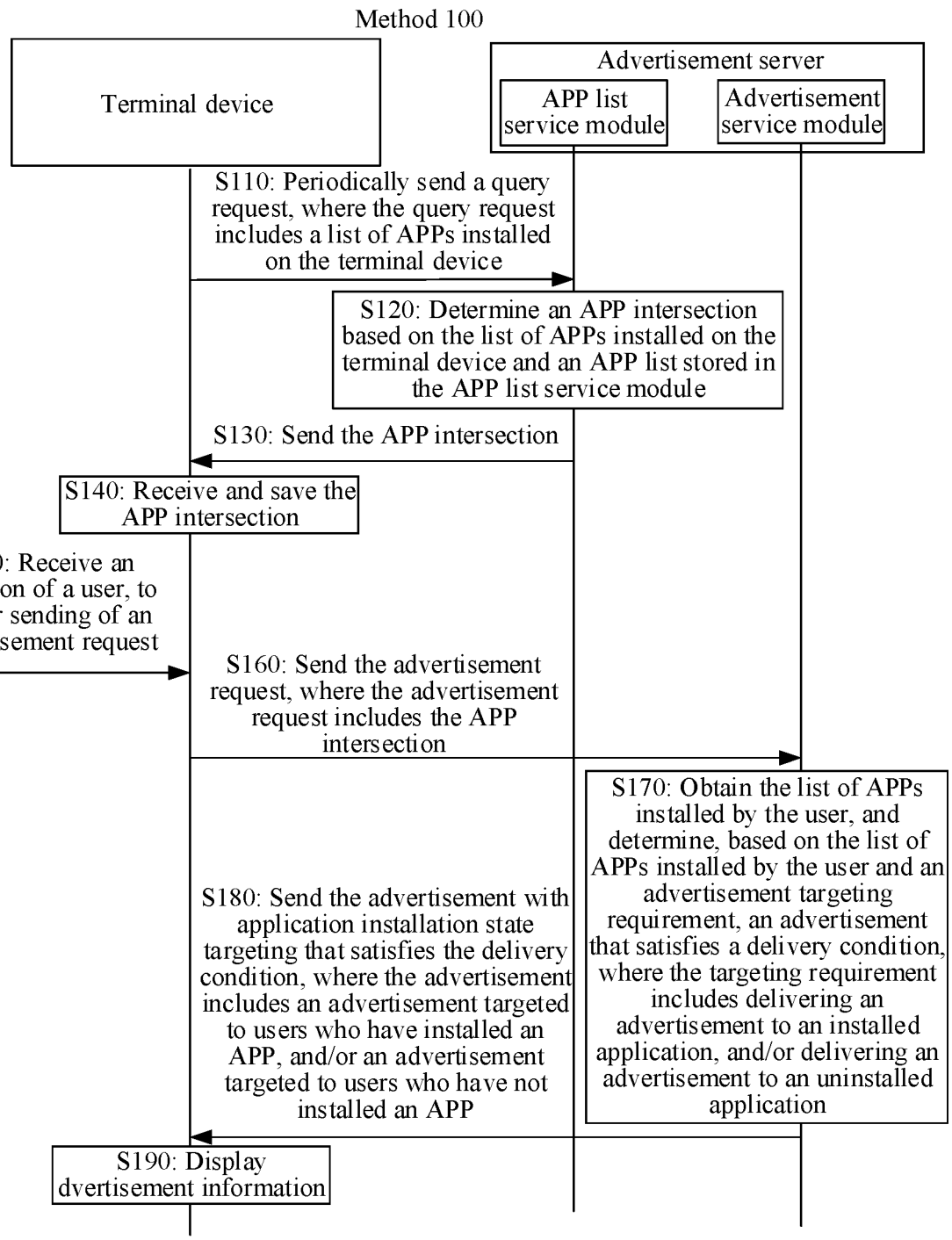
FIG. 5 is a schematic flowchart of an example of an advertisement obtaining method according to this application.

FIG. 5 is a schematic flowchart of an advertisement obtaining method 100 according to this application. The method 100 may be applied to the system shown in FIG. 1.

It should be understood that in embodiments of this application, "APP" and "application" represent the same meaning, and the two expressions may be replaced.

In the method shown in FIG. 5, it is assumed that:
advertisements with application installation state targeting that need to be delivered in an advertisement server by an advertiser include:
an advertisement A: users who have installed a Taobao APP are targeted;
an advertisement B: users who have installed a Jingdong APP are targeted; and
an advertisement C: users who do not install a Pinduoduo APP are targeted.

For example, the advertiser may enter, on the interface shown in FIG. 4, these advertisements with application installation state targeting into the advertisement server.

An application list stored in an APP list service module in the advertisement server is shown in Table 1.

TABLE 1

| Application list stored in the APP list service module | |
|---|---|
| APP package name | APP name |
| com.taobao.taobao | Taobao |
| com.jingdong.app.mall | Jingdong |
| com.xunmeng.pinduoduo | Pinduoduo |
| com.ss.android.ugc.aweme | Douyin |
| com.smile.gifmaker | Kuaishou |
| com.sdu.didi.psnger | Didi Chuxing |
| com.sankuai.meituan | Meituan |

That is, APPs (or may be referred to as APP package names) stored in the APP list service module in the advertisement server include:
com.taobao.taobao; com.jingdong.app.mall; com.xunmeng.pinduoduo;
com.ss.android.ugc.aweme; com.smile.gifmaker,com; sdu.didi.psnger; and
com.sankuai.meituan.

It should be understood that Table 1 is merely an example, and should not constitute any limitation on this application. In this embodiment of this application, a quantity of APPs actually stored in the APP list service module is huge, and is not limited to that shown in Table 1.

It is assumed that APPs installed by a user on the terminal device include:
com.huawei.scenepack; com.huawei.hifolder; com.android.cts.priv.ctsshim;
com.huawei.camera; com.huawei.android.tips; com.huawei.camerakit.impl;
com.huawei.synergy; com.huawei.android.launcher; com.android.mediacenter;
com.android.providers.telephony; com.unionpay.tsmservice; and
com.jingdong.app.mall; and com.xunmeng.pinduoduo.

It should be understood that the APPs installed on the terminal device are merely an example. No limitation should be constituted on this embodiment of this application. In some other embodiments of this application, a quantity of APPs installed on the terminal device is huge, and may include the APPs in the foregoing example, or may not include the APPs in the foregoing example. This is not limited herein in embodiments of this application.

As shown in FIG. 5, the method 100 includes S110 to S190.

S110: The terminal device periodically sends a query request to the APP list service module in the advertisement server, where the query request includes a list of APPs installed by a user on the terminal device. For example, an advertisement SDK module in the terminal device periodically sends the query request to the APP list service module in the advertisement server.

For example, in S110, the terminal device may send the query request to the APP list service module in the advertisement server by invoking an "APP list interface for querying an advertisement with application installation state targeting". The query request includes the list of APPs installed by the user on the terminal device.

Optionally, in S110, the terminal device may send the query request to the APP list service module each time after the terminal device is powered on, or after each detection that a new APP is downloaded and installed, or periodically (for example, every one day or two days). Alternatively, the terminal device may further determine, based on a current network state of the terminal device (for example, a connected network type or a network speed), an occasion for sending the query request.

Optionally, in S110, as a possible implementation, the user may further enable, in an authorization manner, the advertisement SDK module or the terminal device to obtain information about the APPs installed on the terminal device. For example, the terminal device may display a pop-up box to the user, to prompt the user to select "whether to allow obtaining of the list of APPs installed on the terminal device". If the user confirms and agrees to obtain the list of APPs installed on the terminal device, the advertisement SDK module or the terminal device may obtain the information about the APPs installed on the terminal device, and send the query request to the APP list service module.

Optionally, in S110, as another possible implementation, authorization of the user may not be required. The advertisement SDK module or the terminal device may automatically obtain the information about the APPs installed on the terminal device each time after the terminal device is powered on, or after each detection that a new APP is downloaded and installed, or periodically (for example, every one day or two days), and send the query request to the APP list service module.

It is assumed that the list of APPs installed on the terminal device (or may be referred to as a list of APP package names) is as follows:
 com.huawei.scenepack; com.huawei.hifolder; com.android.cts.priv.ctsshim;
 com.huawei.camera; com.huawei.android.tips; com.huawei.camerakit.impl;
 com.huawei.synergy; com.huawei.android.launcher; com.android.mediacenter;
 com.android.providers.telephony; com.unionpay.tsmservice; and
 com.jingdong.app.mall; and com.xunmeng.pinduoduo.

For example, parameter code carried in the query request may be as follows:

targeting (including installed and uninstalled APPs) and APPs associated with advertisements without application installation state targeting.

In S120, because a quantity of APPs actually installed by the user on the terminal device is huge, these APPs include some built-in APPs in a system, and these built-in APPs in the system are not used for advertisement delivery. In addition, among these APPS, some APPs are currently not used by an advertising platform, and these APPs are not used for advertisement delivery. Therefore, APPs that are not used for advertisement delivery may be filtered out from the APPs actually installed on the terminal device. However, the APPs stored in the APP list service module in the advertisement server are basically used for advertisement delivery. For some of these APPS, advertisements with application installation state targeting need to be delivered. Therefore, the APP intersection may be determined between the list of APPs installed on the terminal device and the APP list stored in the APP list service module. APPs included in the APP intersection are basically used for advertisement delivery. In this way, APPs that requires advertisement delivery can be accurately determined.

It is assumed that in S120, the APPs stored in the APP list service module in the advertisement server include:
 com.taobao.taobao; com.jingdong.app.mall; com.xunmeng.pinduoduo;
 com.ss.android.ugc.aweme; com.smile.gifmaker,com; sdu.didi.psnger; and
 com.sankuai.meituan.

It is assumed that APPs installed on the terminal device include:
 com.huawei.scenepack; com.huawei.hifolder; com.android.cts.priv.ctsshim;
 com.huawei.camera; com.huawei.android.tips; com.huawei.camerakit.impl;
 com.huawei.synergy; com.huawei.android.launcher; com.android.mediacenter;

```
{
"insApps": //applications installed on the terminal device
"com.huawei.scenepack,com.huawei.hifolder,com.android.cts.priv.ctsshim,com.huawei.camera,com.huawei.android.tips,com.huawei.camerakit.impl,com.huawei.synergy,com.huawei.android.launcher,com.android.mediacenter,com.android.providers.telephony,com.unionpay.tsmservice,com.jingdong.app.mall,com.xunmeng.pinduoduo"
//: application package names installed on the terminal device
}
```

S120: The APP list service module in the advertisement server determines an APP intersection based on the list of APPs installed on the terminal device and the APP list stored in the APP list service module.

In this embodiment of this application, an APP stored in the APP list service module is the APP related to an advertisement that needs to be delivered by an advertiser. In advertisements that need to be delivered by the advertiser, some advertisements need to be targeted and delivered to users who have installed some APPs or an APP, some advertisements need to be targeted and delivered to users who do not install some APPs or an APP, and some advertisements do not have a requirement for application installation targeting and may be delivered to users who have installed some APPs or an APP and users who do not install APPs or an APP. The APP list stored in the APP list service module includes: APPs with application installation state com.android.providers.telephony; com.unionpay.tsmservice; and
 com.jingdong.app.mall; and com.xunmeng.pinduoduo.

Therefore, the APP intersection includes:
 com.jingdong.app.mall and com.xunmeng.pinduoduo.

S130: The APP list service module in the advertisement server sends the APP intersection to the terminal device. For example, the APP list service module may send the APP intersection to the advertisement SDK module in the terminal device.

In this embodiment of this application, if the APP intersection is stored on the advertisement server, it is necessary to have a user identifier corresponding to the APP intersection. If the user sets to restrict advertisement tracking, the user identifier cannot be determined in the advertisement request that is sent by the user and that is received by the advertisement server, that is, the APP intersection cannot be associated with the user. In addition, because the advertisement server cannot perform authentication and authorization on the advertisement request sent by the user, that is, cannot determine whether the advertisement request is a valid request, if the advertisement request is a malicious request of an attacker, a denial of service (denial of service, Dos) attack may be caused. To be specific, the attacker only needs to change the user identifier of the advertisement request to send the advertisement request infinitely. This greatly consumes storage resources of the advertisement server, and even may cause failure of the advertisement server. Therefore, in S130, the APP list service module in the advertisement server sends the APP intersection to the terminal device used by the user. In this way, the storage resources of the advertisement server may be saved, it is guaranteed that the advertisement server can work normally, and working efficiency of the advertisement server is ensured.

It is assumed that the APP intersection includes:
com.jingdong.app.mall and com.xunmeng.pinduoduo.

For example, parameter code carried when the APP list service module sends the APP intersection to the advertisement SDK module may be shown as follows:

```
{
  "retcode": 0, //return code
  "apps": [ //application package name
    "com.jingdong.app.mall", "com.xunmeng.pinduoduo,"
  ]
}
```

S140: The terminal device receives and saves the APP intersection. For example, the advertisement SDK module in the terminal device may save the APP intersection.

For example, based on the foregoing examples, the APP intersection saved by the advertisement SDK module is as follows:
com.jingdong.app.mall and com.xunmeng.pinduoduo.

It should be understood that, in this embodiment of this application, steps S110 to S140 may be performed for a plurality of times, for example, may be performed periodically, or may be performed each time after the terminal device is powered on or after each detection that a new APP is downloaded and installed. This is not limited herein in embodiments of this application.

S150: The terminal device receives an operation of the user, where the operation is used to trigger sending of the advertisement request.

For example, the operation may include: The user opens an APP (for example, a Huawei Video APP) on the terminal device, or enters an interface specified by an APP, or after opening a video APP on the terminal device, the user taps a displayed video, or in a video play process, sending of the advertisement request is triggered when a pause operation of the user is detected. Alternatively, the user opens an APP (for example, a shopping APP) on the terminal device, or the user taps a link in an APP (for example, a shopping APP) to open a commodity interface. When the APP on the terminal device detects any one of these operations, the terminal device is triggered to generate an advertisement request and send the advertisement request. This is not limited herein in embodiments of this application.

Optionally, in S150, as another possible implementation, the advertisement request may also be automatically triggered in a running process of the APP on the terminal device. The user only needs to open an APP, and then, during running, the APP can automatically trigger sending of the advertisement request. For example, the APP may automatically trigger the terminal device to send the advertisement request, periodically (for example, every one day or two days), or the APP may further determine, based on the current network state of the terminal device (for example, a connected network type or a network speed), an occasion for triggering sending the advertisement request. This is not limited herein in embodiments of this application.

S160: The terminal device sends the advertisement request (or may be referred to as an advertisement query request) to an advertisement module in the advertisement server based on the operation, where the advertisement request includes the APP intersection. For example, the advertisement SDK module in the terminal device may send the advertisement request.

In step S160, the terminal device may send the advertisement request to the advertisement module in the advertisement server based on a network protocol such as a Hypertext Transfer Protocol (hypertext transfer protocol, HTTP), an HTTP channel for security (HTTPS), a file transfer protocol (file transfer protocol, FTP), or a secure file transfer protocol (secure file transfer protocol, SFTP). The advertisement request includes the APP intersection.

For example, when the user opens a client installed in the terminal device, the client may be triggered to invoke the advertisement SDK module, and send the advertisement request to the advertisement server by using a JavaScript object notation (javascript object notation, JSON) message format in the HTTP.

The advertisement request may further carry parameters such as an application package name (pkgname), an advertisement slot ID (slotid), and a requested advertisement type (adtype) of an APP currently used by the user, so that the advertisement server receiving the advertisement request can determine advertisement information matching the advertisement request.

The advertisement slot ID is used to uniquely indicate a specific location of displaying a current to-be-played advertisement on the current APP. The advertisement slot ID is used to uniquely indicate the specific location of the current to-be-played advertisement displayed on the current APP. The requested advertisement type may include a plurality of types such as a banner advertisement (banner), a splash advertisement (splash), and a native advertisement (native). Different advertisement types may be represented by different numbers.

Further, the advertisement request may further include an advertisement slot width (width) and an advertisement slot height (height). The advertisement slot width and the advertisement slot height are usually less than a width and a height of a screen of the terminal device.

In addition, the advertisement request may further include device information of the terminal device, for example, an operating system version (version) in the terminal device, a device maker (maker) to which the terminal device belongs, a device model (model) of the terminal device, an operating system language (language) used by the terminal device, an identifier (oaid) of the terminal device, a type (type) and a version (version) of the terminal device, a version (version) of the SDK, and the like.

It is assumed that the APP intersection saved in the advertisement SDK module is as follows:
com.jingdong.app.mall and com.xunmeng.pinduoduo.

The APP currently used by the user is "Huawei Wallet".

For example, parameter code carried in the advertisement request may be as follows:

```
{
    "app": {
        "name": "Huawei Wallet", //name of the APP currently used by the user
        "pkgname": "com.huawei.wallet", //APP package name
        "version": "8.0.8.300" //APP version
    },
    "device": {
        "height": 1920, // height of terminal device
        "oaid": "a22c389c-e0a1-8353-f014-d3b62721e7d2", //identifier of terminal device
        "language": "zh", //terminal device language
        "maker": "HUAWEI", //terminal device maker
        "model": "MHA-AL00", //terminal device model
        "os": "android", //operating system
        "type": 4, //type of terminal device
        "version": "7.0", //terminal device version
        "width": 1080, //width of terminal device
        "apps": [ //application package name
            "com.jingdong.app.mall", "com.xunmeng.pinduoduo,"
        ],
    },
    "multislot": [{
        "adtype": 3, //advertisement type
        "height": 1920, //height of advertisement slot
        "slotid": "a09itw7hsf", //advertisement slot identifier
        "test": 0, //whether the advertisement is a test advertisement
        "width": 1080 //width of advertisement slot
    }
    ],
    "network": {
        "type": 2 //network type
    },
    "sdkversion": "3.4.11.300" //version of SDK
}
```

In S160, because the advertisement request carries the APP intersection, and does not need to carry information about all APPs (for example, a list of all APPs) actually installed on the terminal device, traffic used by the user can be reduced, and excessive waste of communication resources can be avoided. In addition, a delay of the advertisement request of the user can be reduced, thereby improving user experience and increasing an advertisement display rate.

S170: The advertisement module in the advertisement server obtains, based on the advertisement request, a list of APPs installed by the user, and determines, based on the list of APPs installed by the user and an advertisement targeting requirement, an advertisement that satisfies a delivery condition, where the targeting requirement includes delivering an advertisement to an installed application, and/or delivering an advertisement to an uninstalled application.

For example, in S170, with reference to the foregoing example, the determined list of APPs installed by the user is as follows:

com.jingdong.app.mall and com.xunmeng.pinduoduo.

If a targeting requirement of an advertiser for delivering an advertisement A is: users who have installed a Taobao APP, the advertisement server determines, based on the APP list, that Taobao is not installed on the terminal device used by the user. Therefore, the user does not satisfy a delivery condition of the advertisement A, and then it is determined that the advertisement A is an advertisement that does not satisfy the delivery condition.

If a targeting requirement of the advertiser for delivering an advertisement B is: users who have installed a Jingdong APP, the advertisement server determines, based on the APP list, that the Jingdong APP is installed on the terminal device used by the user. Therefore, the user satisfies a delivery condition of the advertisement B, and then it is determined that the advertisement B is an advertisement that satisfies the delivery condition.

If a targeting requirement of the advertiser for delivering an advertisement C is: users who do not install a Pinduoduo APP, the advertisement server determines, based on the APP list, that the Pinduoduo APP is installed on the terminal device used by the user. Therefore, the user does not satisfy a delivery condition of the advertisement C, and then it is determined that the advertisement C is an advertisement that does not satisfy the delivery condition.

In this case, the determined advertisement that satisfies the delivery condition is only the advertisement B.

S180: The advertisement module in the advertisement server sends, to the terminal device, an advertisement with application installation state targeting that satisfies the delivery condition, where the advertisement includes an advertisement targeted to users who have installed an APP, and/or an advertisement targeted to users who have not installed an APP.

For example, with reference to the foregoing example, in S180, the advertisement module in the advertisement server sends response information to the advertisement SDK module in the terminal device. The response information includes the advertisement information about the advertisement B.

For example, the response information may include parameters such as a return code (retcode) of the advertisement request, an advertisement slot ID (slotid), an advertisement ID, a creative type (creativetype) of an advertisement, an interaction type (interactiontype) of an advertisement, a download link of an advertisement material, and an APP package name of advertisement targeting. The creative types of the advertisement may include types such as a text advertisement, an image advertisement, an image-text advertisement, and a graphics interchange format (GIF) advertisement. The interaction types of the advertisement may include interaction types such as no response after a user tap, opening a related web page after a user tap, downloading an application after a user tap, and entering an application after a user tap.

For example, parameter code carried in information that the advertisement module delivers the advertisement B (an ID of the advertisement B is "2") to the advertisement SDK module may be as follows:

```
{
"retcode": 200, //return code
    "adinfo": //advertisement information
        [{
            "slotid": "a09itw7hsf", //advertisement slot identifier
            "adid": "2", //advertisement ID
            "interactiontype": 3, //interaction type is that the user taps to enter an application
            "creativetype": 2, //creative type is image advertisement
            "image": "http://cs.op.hicloud.com/contserver/data/98BE13F2CD19D40.jpg",
```

```
//advertisement image download link
      "deeplink": "jdapp://XXXXXXXX" //deeplink address for
jumping to Jingdong APP
      "pkgname":"com.jingdong.app.mall", //application package
name
}
  ]
}
```

S190: After receiving the advertisement information, the terminal device may display the advertisement information to the user.

Figure 6A:
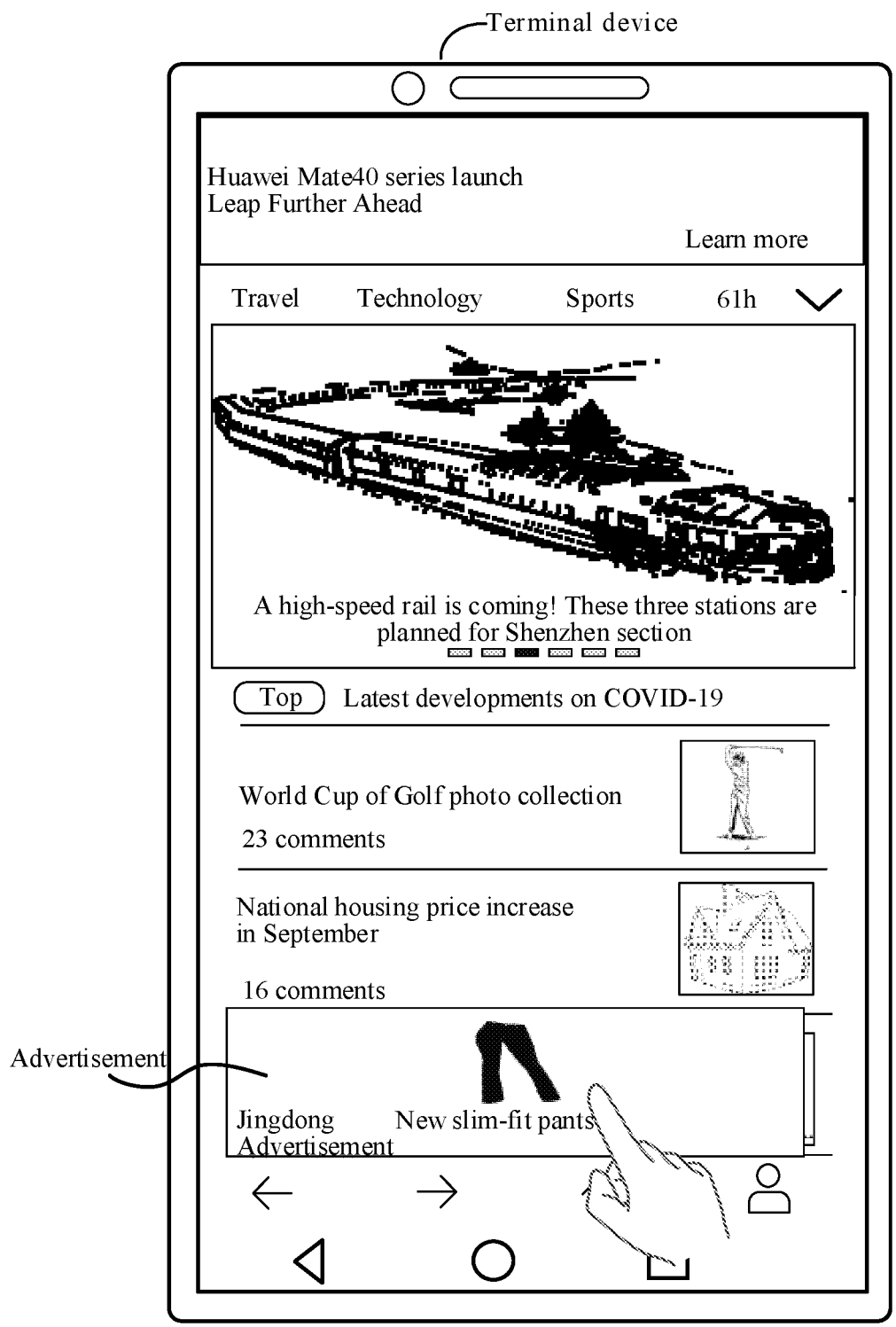
FIG. 6a and FIG. 6b are a schematic interface diagram of an example of displaying, by a terminal device, an advertisement targeted to an installed APP according to this application.
Figure 6B:

For example, it is assumed that the Jingdong APP is installed on the terminal device used by the user, the user browses news on the terminal device, and an interface displayed on the terminal device is shown in FIG. 6a. In this process, the terminal device detects an operation (for example, tapping a piece of specific news information) of the user, and the terminal device is triggered to send the advertisement request to the advertisement server. The advertisement server sends, to the terminal device based on the list of APPs installed by the user, an advertisement with application installation state targeting that satisfies the delivery condition. The advertisement is targeted to users who have installed the Jingdong APP. For example, the advertisement is a trousers advertisement on the Jingdong APP, and a pop-up box of the advertisement displayed on the terminal device may be shown in FIG. 6a. The user may tap the pop-up box, and a displayed interface may be shown in FIG. 6b. A detail interface of the trousers information in the Jingdong APP is directly displayed. The user may purchase or add the trousers to a shopping cart of the user on the interface based on a requirement of the user.

Figure 7A:
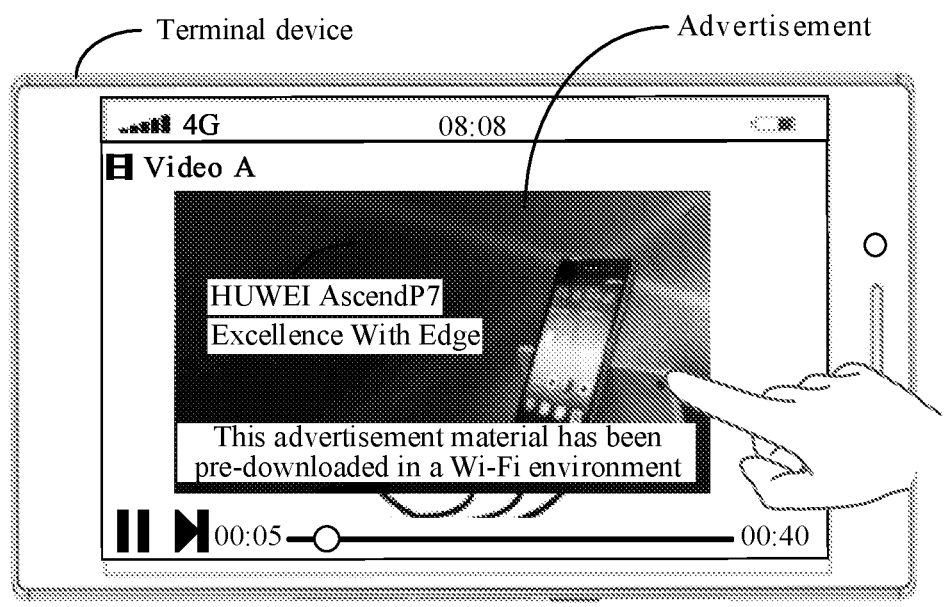
FIG. 7a and FIG. 7b are a schematic interface diagram of another example of displaying, by a terminal device, an advertisement targeted to an installed APP according to this application.
Figure 7B:
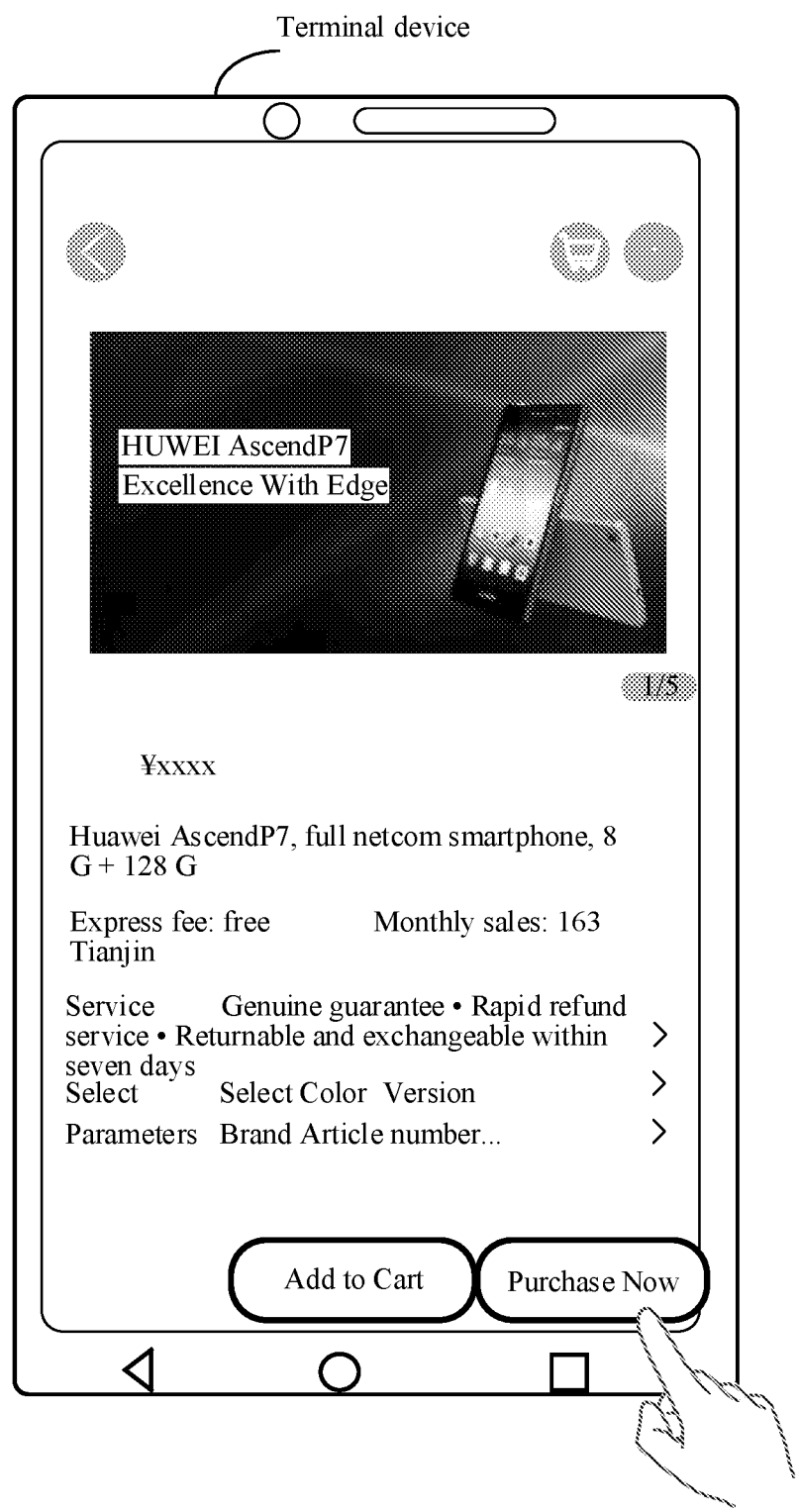

For another example, as shown in FIG. 7a and FIG. 7b, the user plays a video by using a player. If the terminal device detects that the user taps a pause button when playing the video, the terminal device is triggered to send the advertisement request to the advertisement server, and the advertisement server sends, to the terminal device based on the list of APPS installed by the user, an advertisement with application installation state targeting that satisfies a delivery condition. For example, the advertisement is an advertisement of a HUAWEI phone on a shopping APP. It is assumed that the shopping APP has been installed on the terminal device, and then a pop-up box of the advertisement displayed on the terminal device may be shown in FIG. 7a. The user may tap the pop-up box to directly enter a HUAWEI phone detail interface of the shopping APP. The displayed interface may be shown in FIG. 7b. The user may purchase or add the phone to a shopping cart of the user on the interface based on a requirement of the user.

Figure 8A:
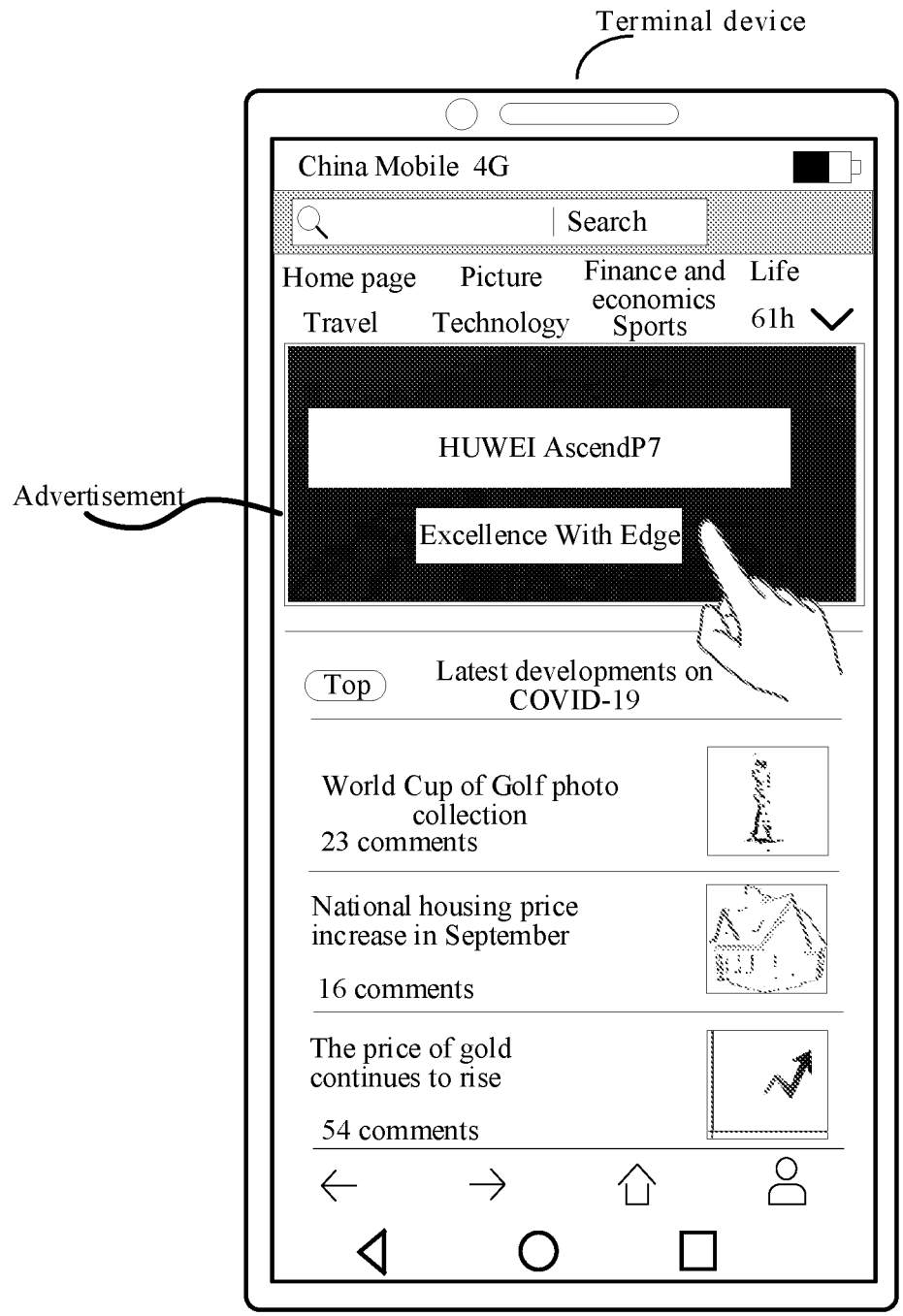
FIG. 8a and FIG. 8b are a schematic interface diagram of another example of displaying, by a terminal device, an advertisement targeted to an installed APP according to this application.
Figure 8B:
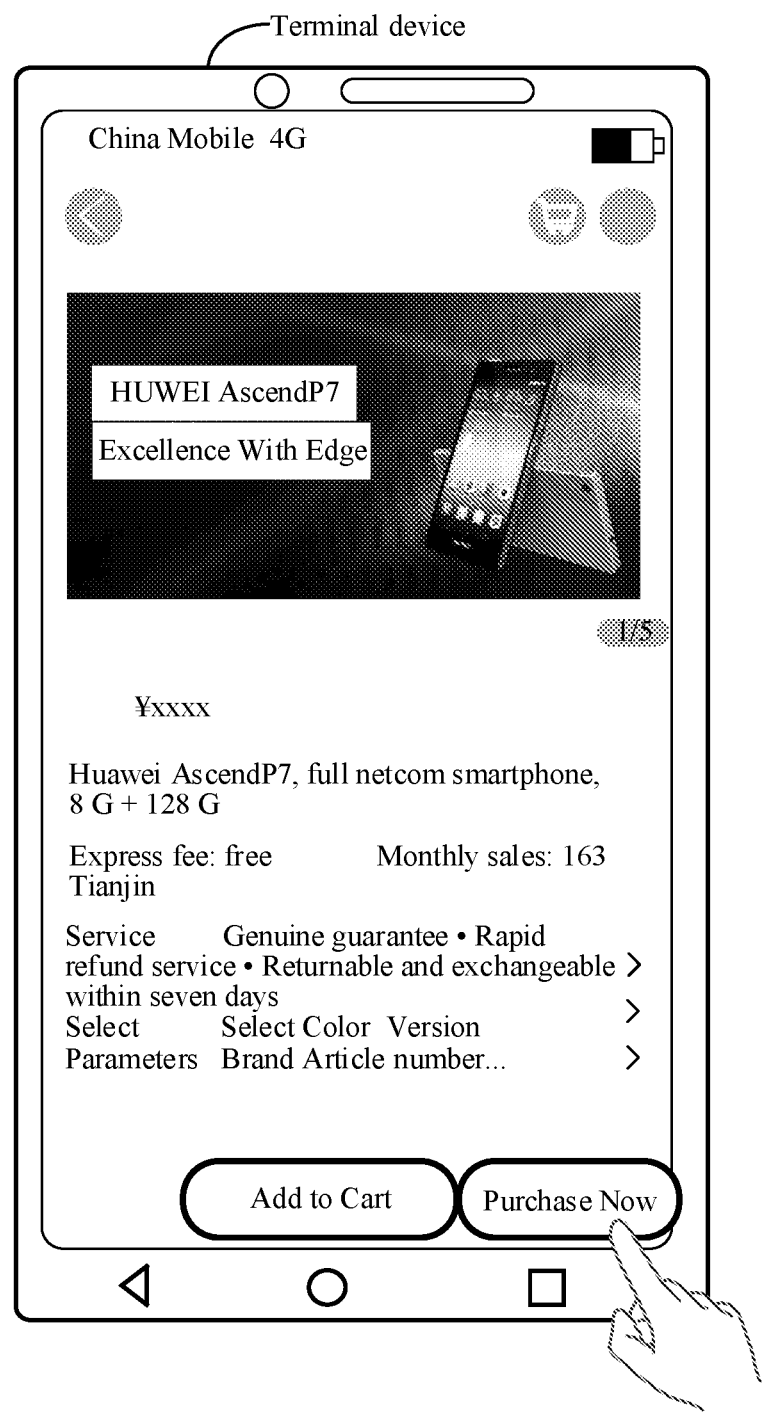

For another example, as shown in FIG. 8a and FIG. 8b, in some embodiments of this application, when the terminal device detects that the user enters a specified interface of an APP, it may be considered that the terminal device has a requirement for displaying an advertisement at that time. As shown in FIG. 8a, after the terminal device detects that the user has opened a browser, the terminal device is triggered to send the advertisement request to the advertisement server. The advertisement request carries a list of APPs installed on the terminal device. The advertisement server sends, to the terminal device based on the list of APPs installed by the user, an advertisement with application installation state targeting that satisfies the delivery condition. For example, the advertisement is an advertisement of a HUAWEI phone on a shopping APP. It is assumed that the shopping APP is installed on the terminal device, and then a pop-up box of the advertisement displayed on the terminal device may be shown in FIG. 8a. The user may tap the pop-up box to directly enter a HUAWEI phone detail interface of the shopping APP. The displayed interface may be shown in FIG. 8b. The user may purchase or add the phone to a shopping cart of the user on the interface based on a requirement of the user.

Figure 9A:
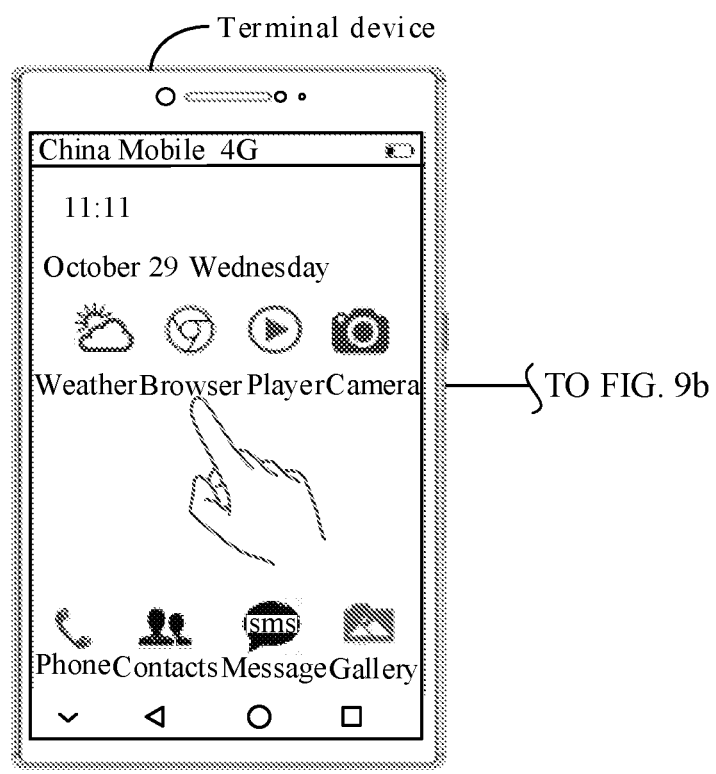
FIG. 9a and FIG. 9b are a schematic interface diagram of still another example of displaying, by a terminal device, an advertisement targeted to an installed APP according to this application.
Figure 9B:
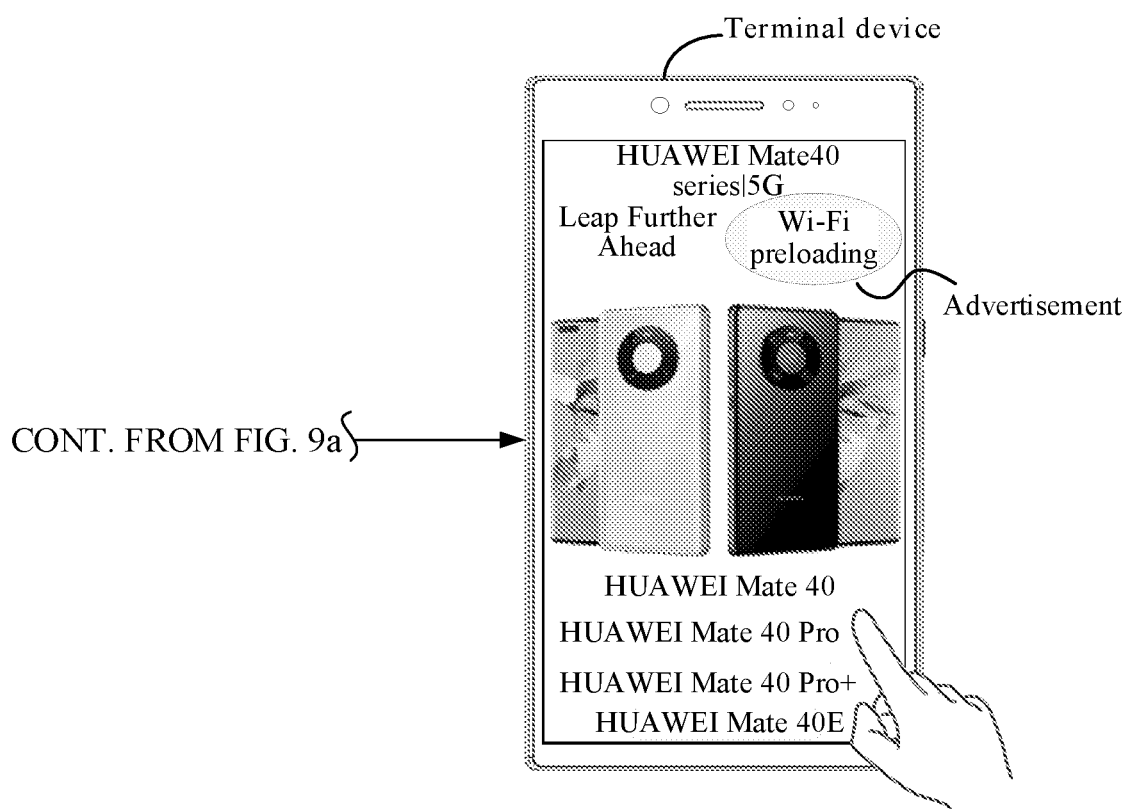

For another example, as shown in FIG. 9a and FIG. 9b, in some embodiments of this application, when the terminal device detects that the user starts an APP, it may be considered that the terminal device has a requirement for displaying an advertisement at that time. As shown in FIG. 9a, when the terminal device detects that the user taps an icon of a browser application on a desktop, the terminal device is triggered to send the advertisement request to the advertisement server. The advertisement request carries a list of APPs installed on the terminal device. The advertisement server sends, to the terminal device based on the list of APPs installed by the user, an advertisement with application installation state targeting that satisfies the delivery condition. For example, the advertisement is targeted to an advertisement of HUAWEI Mate series phones on a shopping APP. It is assumed that the shopping APP is installed on the terminal device, and a pop-up box of the advertisement displayed on the terminal device may be shown in FIG. 9b, that is, an advertisement material is displayed to the user in a browser loading process. The user may tap the pop-up box to directly enter a HUAWEI Mate series phone detail interface of the shopping APP. The user may purchase or add the phone to a shopping cart of the user on the interface based on a requirement of the user.

Optionally, as another possible implementation, the terminal device may further locally store an advertisement delivered by the advertisement server in advance. As shown in FIG. 9a, when the terminal device detects that the user taps the icon of the browser application on the desktop, the terminal device is triggered to display the advertisement locally stored. A displayed interface is, for example, shown in FIG. 9b. The user may tap the pop-up box to directly enter the detail interface of the HUAWEI Mate series phones of the shopping APP.

In other words, in this embodiment of this application, if an advertisement delivered by the advertisement server to the user is an advertisement targeted to users who have installed an APP, in S180, a link included in the advertisement information sent by the advertisement server to the terminal device may be a link pointing to an interface inside the APP. A link to which an advertisement pop-up window displayed on an interface of the terminal device points is a specific interface in the APP or a link to a commodity detail page. The user taps the pop-up window to jump to a specific interface in the APP.

Optionally, as another possible implementation, an advertisement delivered by the advertisement server to the user is an advertisement targeted to users who have not installed an APP. In this case, the user does not install the APP, and the link included in the advertisement information sent by the advertisement server to the terminal device may be a link pointing to an installation interface of the APP. The link to which the advertisement pop-up window displayed on the terminal device interface points is a link of the installation interface of the APP. The user may tap the advertisement pop-up window on an interface displayed on the terminal device, to jump to the installation interface of the APP. The user may determine, based on a requirement of the user, whether to install the APP.

For example, it is assumed that the targeting requirement of an advertiser for delivering advertisement A is: users who do not install the Taobao APP. In S170, the advertisement server determines, based on the APP list, that the Taobao APP is not installed on the terminal device used by the user. Therefore, the user satisfies a delivery condition of the advertisement A, and it is determined that the advertisement A is an advertisement that satisfies the delivery condition.

Figure 10A:
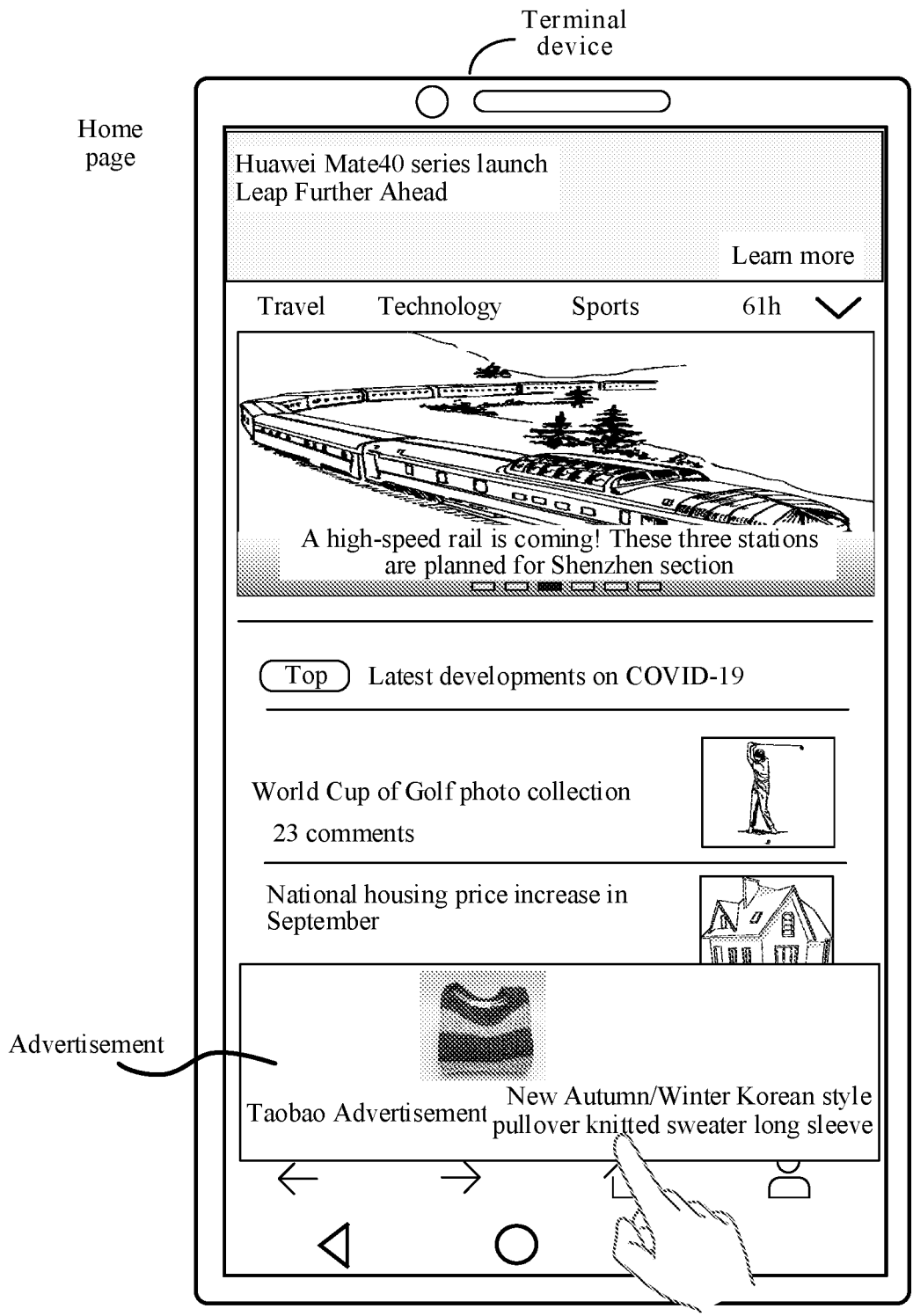
FIG. 10a, FIG. 10b, and FIG. 10c are a schematic interface diagram of an example of displaying, by a terminal device, an advertisement targeted to an uninstalled APP according to this application.
Figure 10B:
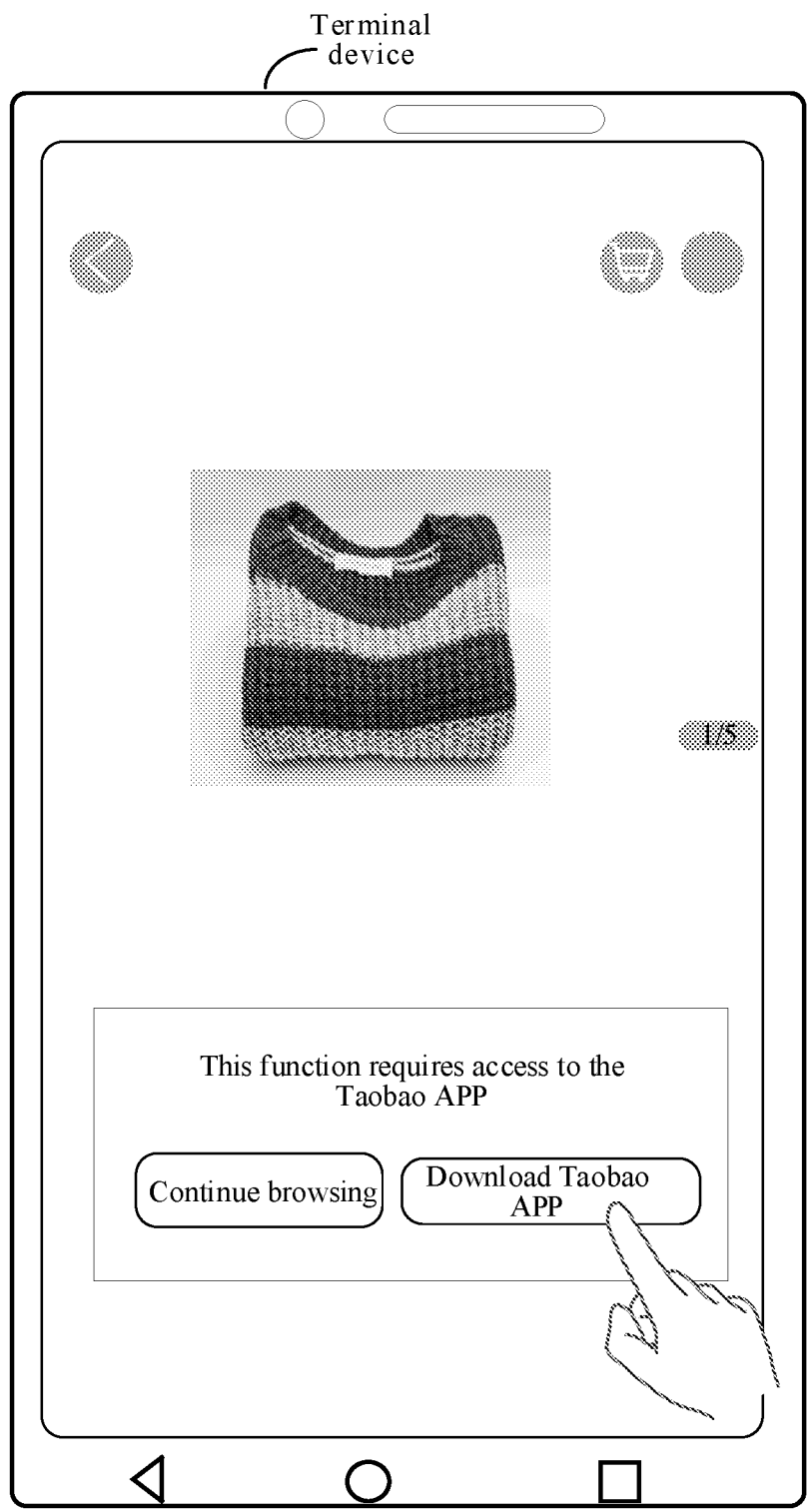
Figure 10C:
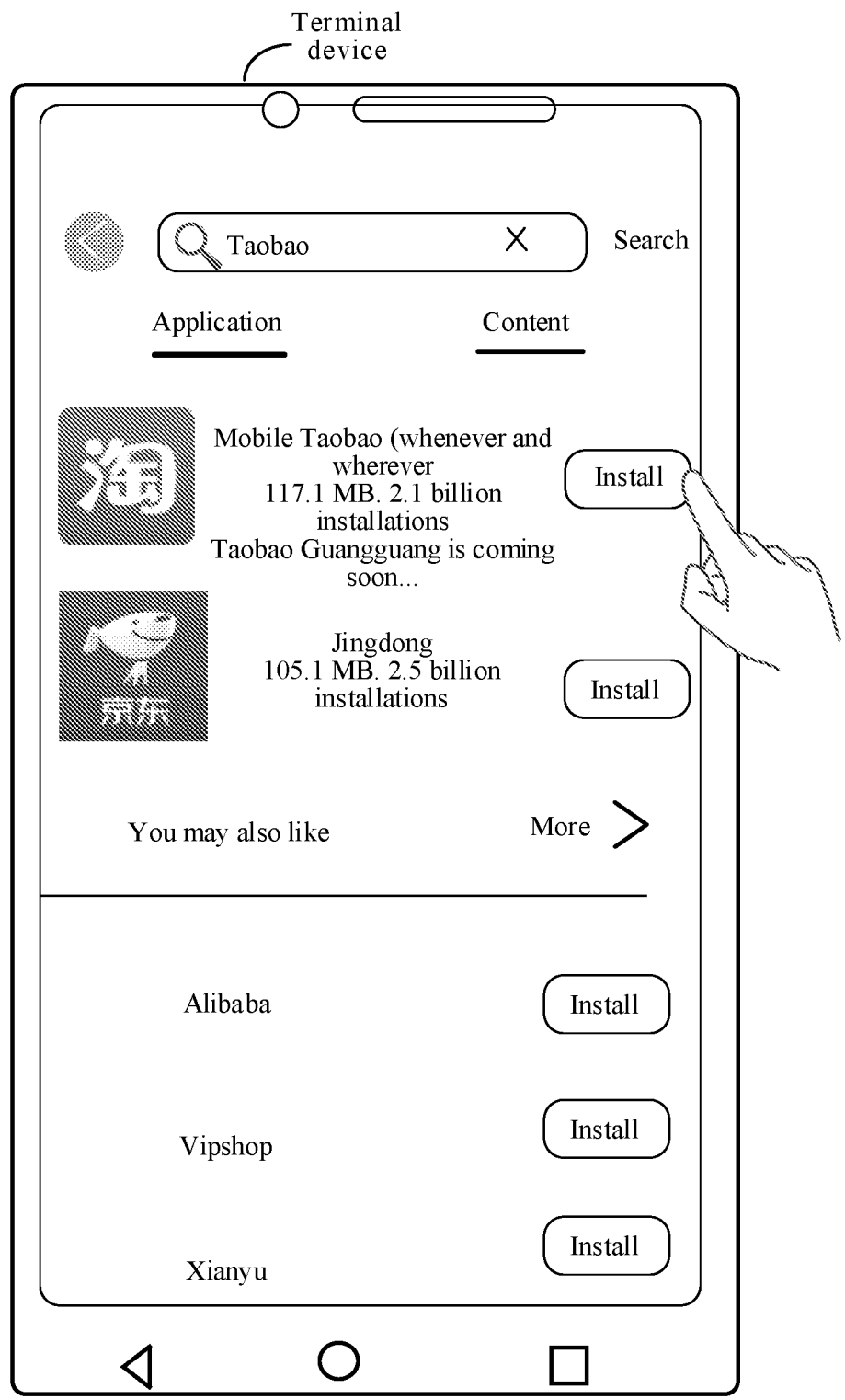

For example, parameter code carried in information that the advertisement service module delivers the advertisement A (an ID of the advertisement A is "3") to the advertisement SDK module may be shown as follows:

Taobao APP. If the user chooses to download the Taobao APP, the user may tap "Downloading Taobao APP" to directly jump to an interface for downloading the Taobao APP in an AppGallery, as shown in FIG. 10c, and the user may determine, based on the requirement of the user, whether to download Taobao.

Figure 11A:
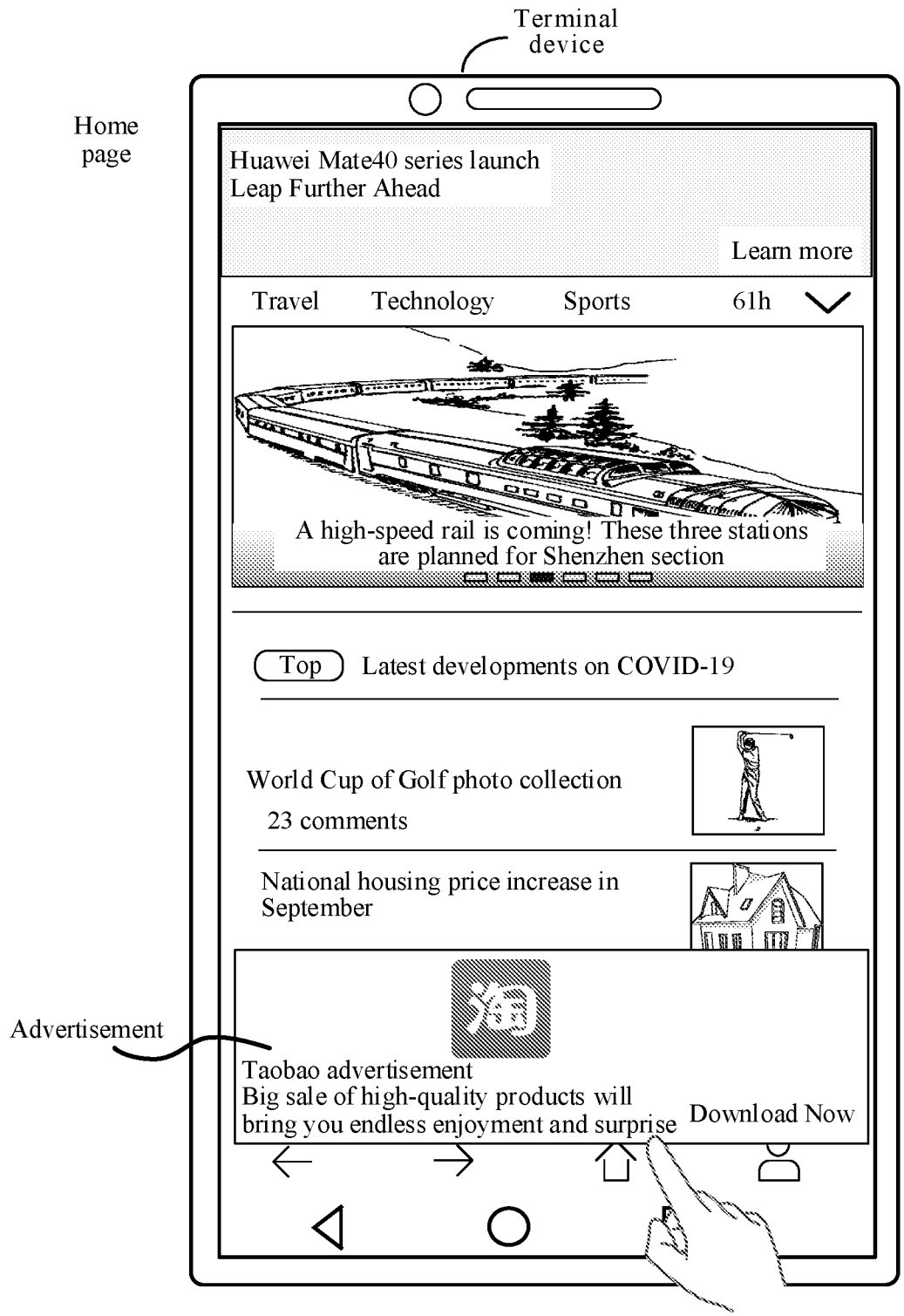
FIG. 11a, FIG. 11b, and FIG. 11c are a schematic interface diagram of another example of displaying, by a terminal device, an advertisement targeted to an uninstalled APP according to this application.

For another example, it is assumed that the Taobao APP is not installed on the terminal device used by the user, and the user browses news on the terminal device. An interface displayed on the terminal device is shown in FIG. 11a. In this process, the terminal device detects that an operation (for example, tapping a piece of specific news information) of the user triggers the terminal device to send the advertisement request to the advertisement server. The advertisement server sends, to the terminal device based on a list of APPs installed by the user, an advertisement with application installation state targeting that satisfies a delivery condition. The advertisement is targeted to users who do not install the Taobao APP. For example, the advertisement is an advertisement for promoting the Taobao APP, and a pop-up box of the advertisement displayed on the terminal device may be shown in FIG. 11a. The user may tap the pop-up box,

```
{
"retcode": 200, //return code
    "adinfo": //advertisement information
        [{
            "slotid": "a09itw7hsf", //advertisement slot identifier
            "adid": "3", //advertisement ID
            "interactiontype": 2, //interaction type is that the user taps to
download an application
"creativetype": 2, //creative type is image advertisement
"image": "http://cs.op.hicloud.com/contserver/data/98BE13F2CD19D40.jpg",
//advertisement image download link
            "pkgname":"com.taobao.app.mall", //application
package name
}
    ]
}
```

After receiving the advertisement information, the user may use "com.taobao.app.mall" to download and install the Taobao APP from an AppGallery or a browser.

For example, it is assumed that the Taobao APP is not installed on the terminal device used by the user, and the user browses news on an APP on the terminal device. In this process, the terminal device sends the advertisement request to the advertisement server. The advertisement request may be that the terminal device detects that an operation (for example, tapping a specific piece of news information) of the user triggers the terminal device to send the advertisement request to the advertisement server, or may be that in the running process of the APP, sending the advertisement request to the advertisement server is automatically triggered, similar to the advertisement type shown in FIG. 10a or in FIG. 8a. The advertisement server sends, to the terminal device based on the list of APPs installed by the user, an advertisement with application installation state targeting that satisfies the delivery condition. The advertisement is targeted to users who do not install the Taobao APP. For example, the advertisement is a knitted sweater advertisement on the Taobao APP, and a pop-up box of the advertisement displayed on the terminal device may be shown in FIG. 10a. The user may tap the pop-up box, and a displayed interface may be shown in FIG. 10b. The displayed interface prompts the user whether to download the Taobao APP. The user may determine, on the interface based on a requirement of the user, whether to download the and a displayed interface may be shown in FIG. 11b. The displayed interface includes an introduction to the Taobao APP. The user may determine, on the interface based on a requirement of the user, whether to download the Taobao APP. If the user is to download the Taobao APP, the user taps "Download Now" to directly jump to an interface for downloading the Taobao APP in an AppGallery, as shown in FIG. 11c. The user may determine, based on the requirement of the user, whether to install the Taobao APP.

Figure 11B:
Figure 11C:
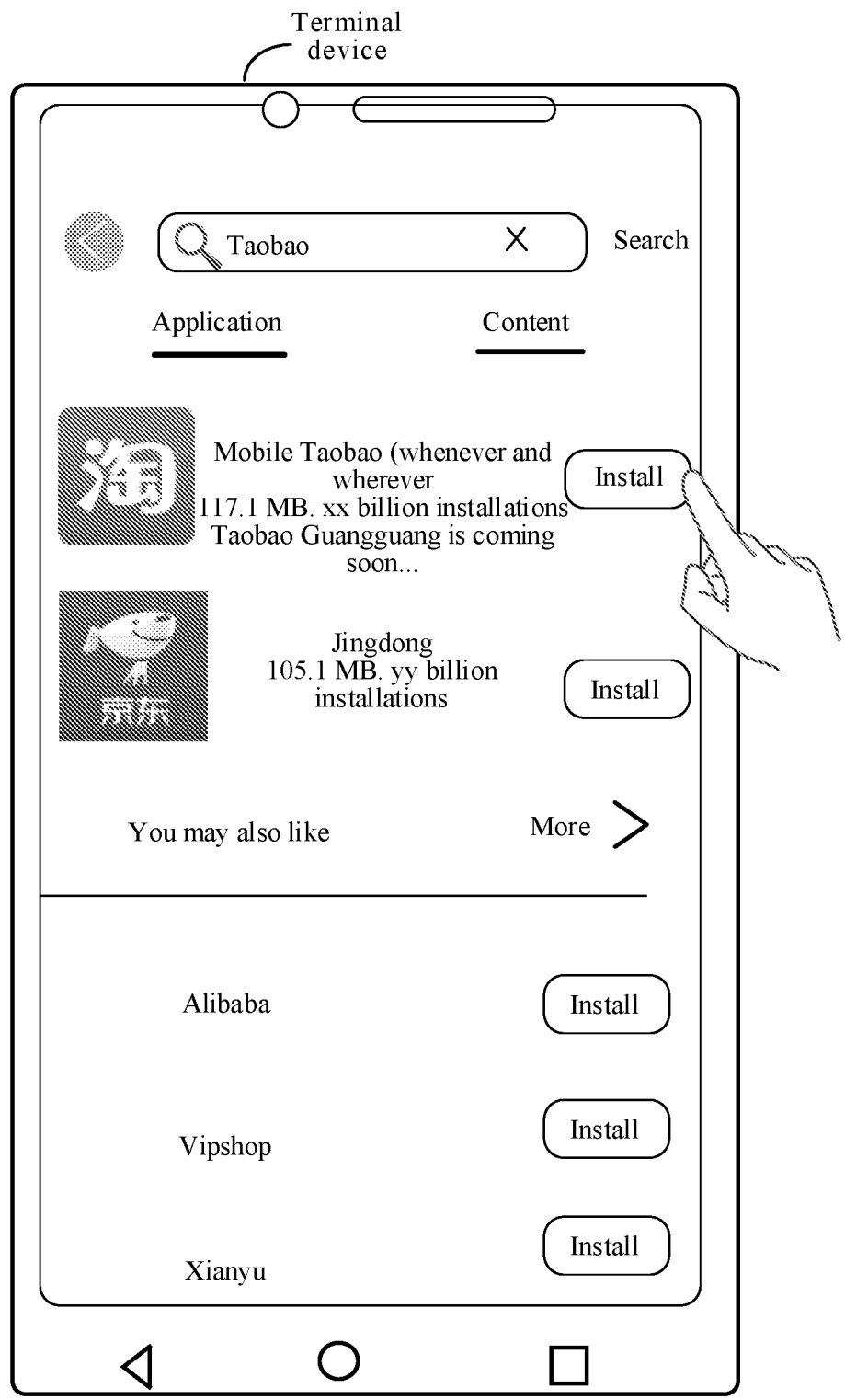

Optionally, in the interfaces shown in FIG. 10a, FIG. 10b, and FIG. 10c, and FIG. 11a, FIG. 11b, and FIG. 11c, for example, after the user operates on the interface of FIG. 11a to directly jump to an interface of FIG. 11c, that is, an interface displayed in FIG. 11b may be optional, and the interface displayed in FIG. 11b may not be displayed. The interface displayed in FIG. 10b may also be optional, that is, the interface displayed in FIG. 10b may not be displayed.

It should be further understood that, in embodiments of this application, the interface diagrams shown in FIG. 6a and FIG. 6b to FIG. 11a, FIG. 11b, and FIG. 11c are merely examples, and should not constitute any limitation on an interface in which the user triggers the terminal device to send the advertisement request and the terminal device displays an advertisement in embodiments of this application. For example, in some other embodiments of this application, icons displayed on an interface of a terminal device may include more or fewer icons than those displayed on the interfaces shown in FIG. 6a and FIG. 6b to FIG. 11a, FIG. 11b, and FIG. 11c, or combine some icons, or split some icons, or different icons. This is not limited herein in embodiments of this application.

According to the advertisement obtaining method provided in this application, a user periodically reports APPs installed on a terminal device, and an advertisement server obtains, based on the APPs installed on the terminal device and an APP list stored on the advertisement server, an APP intersection of the APPs installed on the terminal device and the APP list stored on the advertisement server, and sends the APP intersection to the terminal device. When the terminal device requests an advertisement, the APP intersection is carried. The advertisement server determines, based on the APP intersection and an APP installation state targeting condition of each advertisement that needs to be delivered, an advertisement that satisfies the targeting condition, for delivery. In this way, regardless of whether the advertisement request sent by the user carries an advertisement tracking identifier, accuracy of application installation state targeting can be ensured, thereby ensuring delivery accuracy of an advertisement with application installation state targeting. In addition, a delay of the advertisement request of the user can also be reduced, thereby increasing an advertisement display rate, improving delivery efficiency of an advertisement with application installation state targeting, and improving user experience.

Figure 12A:
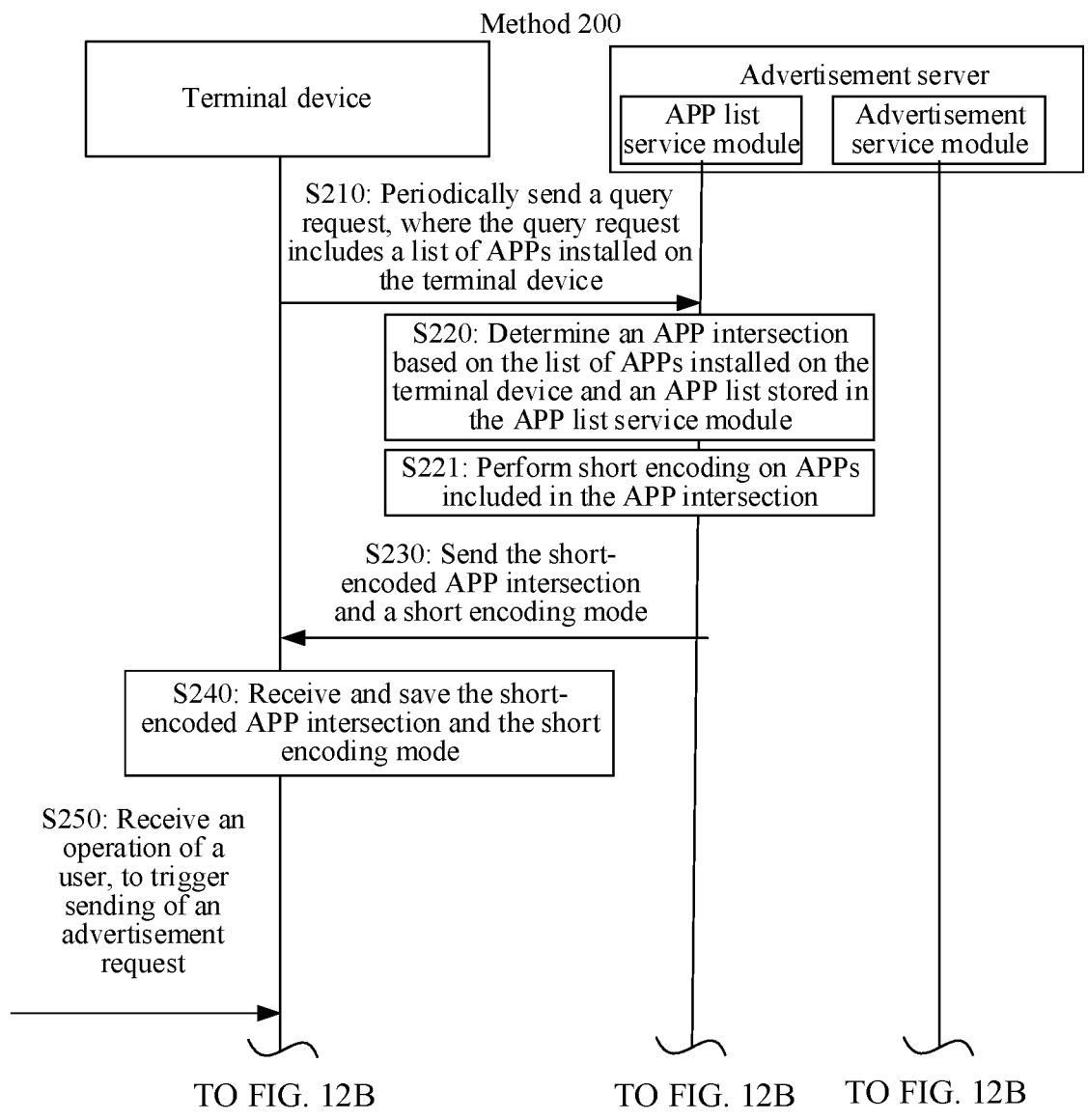
FIG. 12A and FIG. 12B are a schematic flowchart of another example of an advertisement obtaining method according to this application.
Figure 12B:
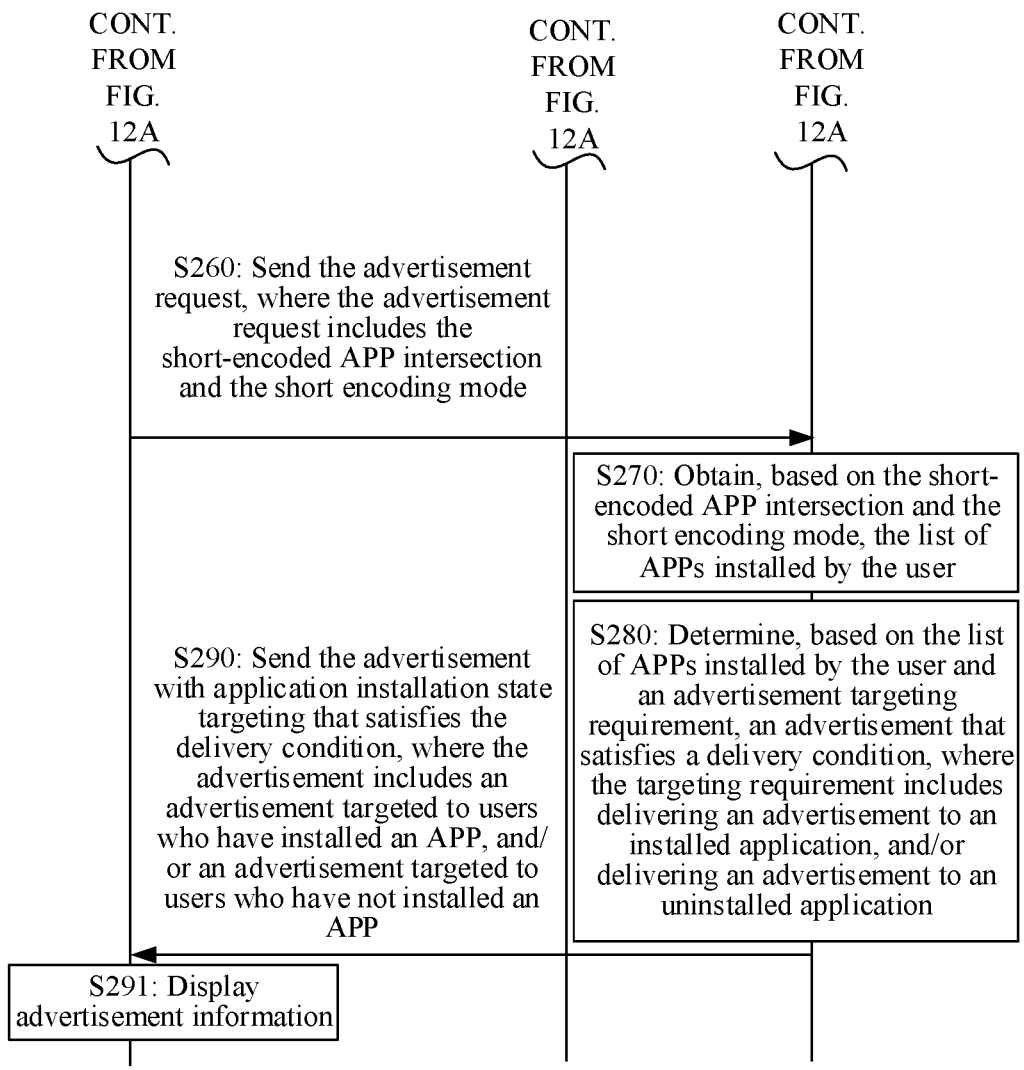

Optionally, in embodiments of this application, as another possible implementation, as shown in FIG. 12A and FIG. 12B, FIG. 12A and FIG. 12B are a schematic flowchart of another advertisement obtaining method 200 according to this application. As shown in FIG. 12A and FIG. 12B, the method 200 includes S210 to S291.

In the method shown in FIG. 12A and FIG. 12B, it is assumed that:
advertisements with application installation state targeting that need to be delivered in an advertisement server by an advertiser include:
an advertisement A: users who have installed a Taobao APP are targeted;
an advertisement B: users who have installed a Jingdong APP are targeted; and
an advertisement C: users who do not install a Pinduoduo APP are targeted.

S210: A terminal device periodically sends a query request to an APP list service module in the advertisement server, where the query request includes a list of APPs installed by a user on the terminal device.

S220: The APP list service module in the advertisement server determines an APP intersection based on the list of APPs installed on the terminal device and an APP list stored in the APP list service module.

For descriptions of specific steps corresponding to S210 and S220, refer to descriptions of corresponding steps in S110 and S120 in the foregoing method 100. For brevity, details are not described herein again.

S221: The APP list service module in the advertisement server performs short encoding on an APP included in the APP intersection.

Specifically, in S221, in practice, a quantity of APPs included in the APP intersection may also be huge, that is, a length of a string occupied by the APP intersection is very large. In this way, when the advertisement request sent by the terminal device carries the APP intersection, traffic usage of the user is affected. In addition, a delay of the advertisement request of the user is affected, thereby affecting user experience and an advertisement display rate. Therefore, in S221, short encoding may be performed on an APP (APP package name) included in the APP intersection.

For example, in this embodiment of this application, the APP list service module in the advertisement server may perform short encoding on APPs stored in the APP list service module in the advertisement server. Short encoding modes include all encoding modes that can reduce a length of a character that needs to be encoded, that is, a length of a character before encoding is greater than a length of the character after encoding.

For example, the APPs (APP package names) stored in the APP list service module in the advertisement server include:
com.taobao.taobao; com.jingdong.app.mall; com.xunmeng.pinduoduo;
com.ss.android.ugc.aweme; com.smile.gifmaker,com; sdu.didi.psnger; and
com.sankuai.meituan.

The APP list service module encodes these APPs by using a short encoding mode 1 (the short encoding mode 1 is a short encoding mode identifier). A case in which short encoding is performed on the APPs stored in the APP list service module in the advertisement server may be shown in Table 2.

TABLE 2

Table of short encoding performed on an application list stored in the APP list service module

| APP package name | APP name | Short encoding mode identifier | Short encoding value |
|---|---|---|---|
| com.taobao.taobao | Taobao | 1 | ac1g6 |
| com.jingdong.app.mall | Jingdong | 1 | d56bw |
| com.xunmeng.pinduoduo | Pinduoduo | 1 | e00ht |
| com.ss.android.ugc.aweme | Douyin | 1 | ef0h4 |
| com.smile.gifmaker | Kuaishou | 1 | asd0h |
| com.sdu.didi.psnger | Didi Chuxing | 1 | mk9rc |
| com.sankuai.meituan | Meituan | 1 | ju896 |

It can be learned from Table 2 that a string length of a short encoding value obtained after a string of an application package name is short-encoded is apparently shorter than a length of the original string of the application package name. In the example shown in Table 2, a result of performing short encoding on each application package name is represented by five characters.

In S221, with reference to the example of the method 100, it is assumed that the APP intersection includes:
com.jingdong.app.mall and com.xunmeng.pinduoduo.

A result obtained after short encoding is performed on the APPs included in the APP intersection by using the short encoding mode 1 is as follows:
encodedapps: ["d56bw", "e00ht"].
"encodedapps" indicates short encoding values obtained after the APPs are short-encoded.

The short encoding mode 1 may be represented as encodingmode:1.
"encodingmode" is used to represent the short encoding mode.

In this case, an encoding result of performing short encoding on the APP intersection and the short encoding mode may be represented as follows:
encodedapps: ["d56bw", "e00ht"], encodingmode:1.

In the example shown in Table 2, the short encoding result is represented by using only uppercase letters, lowercase letters, and digits, that is, a to z, A to Z, and 0 to 9 are used to represent the short encoding result, where a to z, A to Z, and 0 to 9 cover 62 characters in total. For each application package name, counting up from 1, a digital identity (identity, ID) is allocated to each application package name. A normal digital ID is a decimal number. Then, the digital ID is converted into a 62-digit number, and a length of an original character is greatly shortened.

For example, three characters can generate 62³ IDs, that is, 238328 IDs.

Four characters can generate 62⁴ IDs, that is, 14776336 IDs.

Five characters can generate 62⁵ IDs, that is, 916132832 IDs.

It is assumed that the user has installed 252 applications (APPs) on the terminal device, and a total length of all APP package names is 6087 characters. If a short encoding value obtained after short encoding is performed on each application package name is represented by five characters, assuming that all the applications are short-encoded, a total length of characters that are short-encoded is 252×6=1512 characters. The length is reduced to a quarter of the original length. Further, assuming that only one quarter of the package names are included in the APP intersection after the APP intersection is obtained, the total length of the characters is changed to 378 characters.

Optionally, in S221, as another possible implementation, in this embodiment of this application, it is assumed that the foregoing 62 characters are insufficient, other visible characters are added, then a total of 82 different characters are obtained. In this case, an algorithm and a character set for short encoding and decoding change, and a length of an encoded application package name is four characters. For example, Table 3 is a table in which the application list stored in the APP list service module is short-encoded by using 82 different characters.

TABLE 3

Table of short encoding performed on the application list stored in the APP list service module

| APP package name | APP name | Short encoding mode identifier | Short encoding value |
|---|---|---|---|
| com.taobao.taobao | Taobao | 2 | A?1g |
| com.jingdong.app.mall | Jingdong | 2 | d5@b |
| com.xunmeng.pinduoduo | Pinduoduo | 2 | e0%h |
| com.ss.android.ugc.aweme | Douyin | 2 | ef0h |
| com.smile.gifmaker | Kuaishou | 2 | Asd& |
| com.sdu.didi.psnger | Didi Chuxing | 2 | mk9> |
| com.sankuai.meituan | Meituan | 2 | ju8# |

It can be learned from Table 3 that a string length of a short encoding value obtained after a string of an application package name is short-encoded is apparently shorter than a length of the original string of the application package name. In the example shown in Table 3, a result of performing short encoding on each application package name is represented by four characters.

In S211, it is assumed that the APP intersection includes: com.jingdong.app.mall and com.xunmeng.pinduoduo.

A result obtained after short encoding is performed on the APPs included in the APP intersection by using the short encoding mode 2 is as follows:
encodedapps: ["d5@b", "e0% h"].
"encodedapps" indicates short encoding values obtained after the APPs are short-encoded.

The short encoding mode 2 may be represented as encodingmode:2.

"encodingmode" is used to represent the short encoding mode.

In this case, an encoding result of performing short encoding on the APP intersection and the short encoding mode may be represented as follows:
encodedapps: ["d5@b", "e0% h"], encodingmode:2.

It should be understood that, in this embodiment of this application, there are a plurality of short encoding modes, and the examples in Table 2 and Table 3 should not constitute any limitation to the short encoding modes in embodiments of this application. In some other embodiments of this application, the APP package names included in the APP intersection may be short-encoded in another short encoding mode. This is not limited herein in embodiments of this application.

It should be further understood that, in this embodiment of this application, if a currently used short encoding mode is not the shortest, another short encoding mode may be further used. However, regardless of which short encoding mode is used, an ID needs to be used to represent the used short encoding mode, that is, an "encodingmode" field is required. In this way, how to perform reverse decoding is known during decoding.

S230: The APP list service module in the advertisement server sends the short-encoded APP intersection and a short encoding mode to the terminal device.

With reference to the foregoing example, it is assumed that the APP intersection includes:
com.jingdong.app.mall and com.xunmeng.pinduoduo.

The short-encoded APP intersection and the short encoding mode are as follows:
encodedapps: ["d5@b", "e0% h"], encodingmode:2; or
encodedapps: ["d56bw", "e00ht"], encodingmode:1.

For example, the short-encoded APP intersection and the short encoding mode may be as follows:

{
  "retcode": 0, //return code
  "encodedapps ": [ //encoded APP package name
    "d56bw","e00ht"
  ],
  "encodingmode": 1 //encoding mode
}
or
{
  "retcode": 0, //return code
  "encodedapps": [ //encoded APP package name
    "d5@b","e0%h"
  ],
  "encodingmode": 2 //encoding mode
}

S240: The terminal device receives and saves the short-encoded APP intersection and the short encoding mode.

For example, in S240, the short-encoded APP intersection and the short encoding mode that are stored by the terminal device are as follows:
encodedapps: ["d56bw", "e00ht"], encodingmode:1; or
encodedapps: ["d5@b", "e0% h"], encodingmode:2.

S250: The terminal device receives an operation of the user, where the operation is used to trigger sending of the advertisement request.

For descriptions of specific steps corresponding to S250, refer to descriptions of corresponding steps in S150 in the foregoing method 100. For brevity, details are not described herein again.

S260: The terminal device sends the advertisement request to the advertisement module in the advertisement server, where the advertisement request includes the short-encoded APP intersection and the short encoding mode.

In step S260, the terminal device may send the advertisement request to the advertisement module in the advertisement server based on a network protocol such as an HTTP, an HTTP channel for security (HTTPS), a File Transfer Protocol (FTP), or a Secure File Transfer Protocol (SFTP). The advertisement request includes the short-encoded APP intersection and the short encoding mode.

It is assumed that the short-encoded APP intersection and the short encoding mode stored in the advertisement SDK module are as follows:

encodedapps: ["d5@b", "e0% h"], encodingmode:2.

For example, in S250, parameter code carried in the advertisement request may be shown as follows:

h"] is decoded. A finally determined APP package name list installed by the user is as follows:

com.jingdong.app.mall and com.xunmeng.pinduoduo.

S280: The advertisement module in the advertisement server determines, based on the list of APPs installed by the user and an advertisement targeting requirement, an advertisement that satisfies a delivery condition, where the targeting requirement includes delivering an advertisement to an installed application, and/or delivering an advertisement to an uninstalled application.

For descriptions of specific steps corresponding to S280, refer to descriptions of steps corresponding to S170 in the foregoing method 100. For brevity, details are not described herein again.

S290: The advertisement module in the advertisement server sends, to an advertisement SDK module in the

```
{
    "app": {
        "name": "Huawei Wallet", // name of the APP currently used by the user
        "pkgname": "com.huawei.wallet", //APP package name
        "version": "8.0.8.300" //APP version
    },
    "device": {
        "height": 1920, // height of terminal device
        "oaid": "a22c389c-e0a1-8353-f014-d3b62721e7d2", //identifier of terminal device
        "language": "zh", //terminal device language
        "maker": "HUAWEI", //terminal device maker
        "model": "MHA-AL00", //terminal device model
        "os": "android", //operating system
        "type": 4, //terminal device type
        "version": "7.0", //terminal device version
        "width": 1080, //width of device
        "encodedapps": [ //encoded APP package name
            "d5@b","e0%h"
        ],
        "encodingmode": 2 //encoding mode
    },
    "multislot": [{
        "adtype": 3, //advertisement type
        "height": 1920, //height of advertisement slot
        "slotid": "a09itw7hsf", //advertisement slot identifier
        "test": 0, //whether the advertisement is a test advertisement
        "width": 1080 //width of advertisement slot
    }
    ],
    "network": {
        "type": 2 //network type
    },
    "sdkversion": "3.4.11.300" //version of SDK
}
```

S270: The advertisement module in the advertisement server obtains, based on the short-encoded APP intersection and the short encoding mode, a list of APPs installed by a user.

In S270, the advertisement module in the advertisement server first determines a corresponding decoding mode based on the short encoding mode identifier, and then decodes, based on the decoding mode, the short-encoded APP intersection, to finally determine the list of APPs installed by the user.

For example, it is assumed that the short-encoded APP intersection and the short encoding mode are as follows:

encodedapps: ["d5@b", "e0% h"], encodingmode:2.

The advertisement module in the advertisement server first determines, based on the identifier "encodingmode:2" of the short encoding mode, that the identifier of the used decoding mode should also be "2". Then, ["d5@b", "e0% terminal device, an advertisement with application installation state targeting that satisfies the delivery condition, where the advertisement includes an advertisement targeted to users who have installed an APP, and/or an advertisement targeted to users who have not installed an APP.

For descriptions of specific steps corresponding to S290, refer to descriptions of steps corresponding to S180 in the foregoing method 100. For brevity, details are not described herein again.

For example, in S290, the advertisement module in the advertisement server sends or delivers advertisement B to the advertisement SDK module in the terminal device.

For example, it is assumed that the short-encoded APP intersection is as follows:

encodedapps: ["d5@b", "e0% h"].

If a targeting requirement of an advertiser for delivering the advertisement B is: users who have installed a Jingdong APP, it is determined, based on the APP list, that the Jingdong APP is installed on the terminal device used by the user. Therefore, the user satisfies a delivery condition of advertisement B, and then it is determined that the advertisement B is an advertisement that satisfies the delivery condition.

Parameter code carried in information that the advertisement module delivers the advertisement B (an ID of the advertisement B is "2") to the advertisement SDK module may be as follows:

```
{
"retcode": 200, //return code
  "adinfo": //advertisement information
    [{
       "slotid": "a09itw7hsf", //advertisement slot identifier
       "adid": "2", //advertisement ID
       "interactiontype": 3, //interaction type is that the user taps to
enter an application
       "creativetype": 2, //creative type is image advertisement
"image": "http://cs.op.hicloud.com/contserver/data/98BE13F2CD19D40.jpg",
//advertisement image download link
       "deeplink": "jdapp://XXXXXXXX" //deeplink address for
jumping to Jingdong APP
         "pkgname": "com.jingdong.app.mall", //application
package name
         "encodedpkgname":"d5@b" //short-encoded application
package name
}
]
}
```

Optionally, as another possible implementation, it is assumed that a targeting requirement of an advertiser for delivering an advertisement A is: users who do not install a Taobao APP. In S280, the advertisement server determines, based on the APP list, that the Taobao APP is not installed on the terminal device used by the user. Therefore, the user satisfies a delivery condition of the advertisement A, and it is determined that the advertisement A is an advertisement that satisfies the delivery condition.

For example, parameter code carried in information that the advertisement service module delivers the advertisement A (an ID of the advertisement A is "3") to the advertisement SDK module may be shown as follows:

```
{
"retcode": 200, //return code
  "adinfo": //advertisement information
    [{
       "slotid": "a09itw7hsf", //advertisement slot identifier
       "adid": "3", //advertisement ID
       "interactiontype": 2, //interaction type is that the user taps to
download an application
       "creativetype": 2, //creative type is image advertisement
"image": "http://cs.op.hicloud.com/contserver/data/98BE13F2CD19D40.jpg",
//advertisement image download link
         "pkgname":"com.taobao.app.mall", //application
package name
         "encodedpkgname": "A? 1g" //short-encoded application
package name
}
]
}
```

S291: After receiving the advertisement information, the terminal device may display the advertisement information to the user.

After receiving the advertisement information, the terminal device may use "com.taobao.app.mall" to download and install the Taobao APP from an AppGallery or a browser.

According to the advertisement obtaining method provided in this application, a user periodically reports APPs installed on a terminal device; and an advertisement server obtains, based on the APPs installed on the terminal device and APPs stored on the advertisement server, an APP intersection of the APPs installed on the terminal device and the APPs stored on the advertisement server, and performs short encoding on the APP intersection and sends a result of performing the short encoding on the APP intersection and a short encoding mode to the terminal device. When the terminal device requests an advertisement, the short encoding results and the short encoding mode are carried. The advertisement server determines, based on the short encoding results and the short encoding mode, APPs installed by the user, and determines, based on an APP installation state targeting condition of each advertisement, an advertisement that satisfies the targeting condition, for delivery, thereby ensuring delivery accuracy of an advertisement with application installation state targeting. Further, excessive consumption of user traffic is avoided and then a delay of the advertisement request is reduced, thereby increasing an advertisement display rate, improving delivery efficiency of an advertisement with application installation state targeting, and improving user experience.

Figure 13:
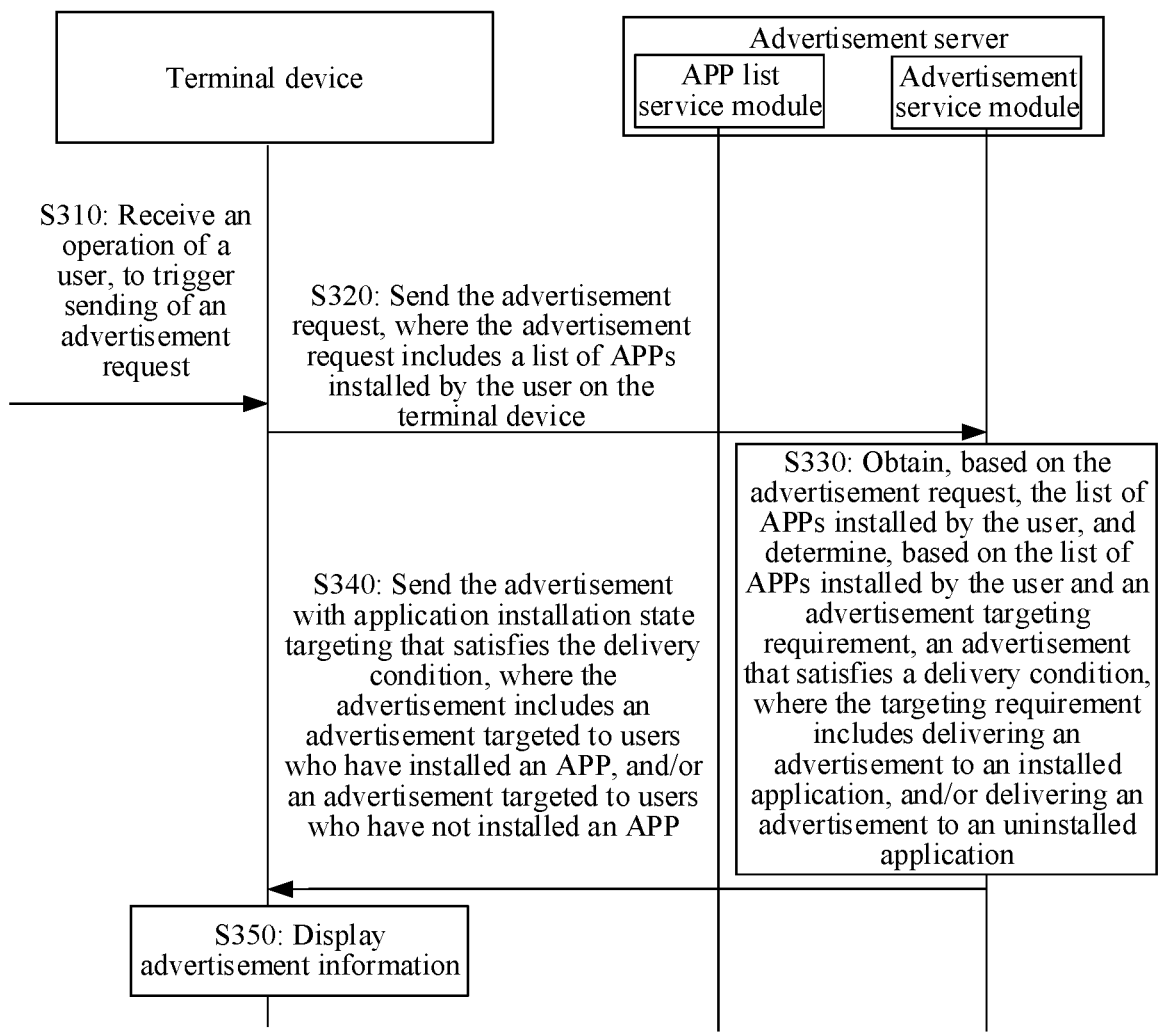
FIG. 13 is a schematic flowchart of still another example of an advertisement obtaining method according to this application.

Optionally, in embodiments of this application, as another possible implementation, as shown in FIG. 13, FIG. 13 is a schematic flowchart of another advertisement obtaining method 300 according to this application. As shown in FIG. 13, the method 300 includes S310 to S350.

S310: A terminal device receives an operation of a user, where the operation is used to trigger sending of an advertisement request.

For descriptions of specific steps corresponding to S310, refer to descriptions of steps corresponding to S150 in the foregoing method 100. For brevity, details are not described herein again.

S320: The terminal device sends the advertisement request to an advertisement service module in an advertisement server, where the advertisement request includes a list of APPs installed by the user on the terminal device.

For descriptions of specific steps corresponding to S320, refer to descriptions of steps corresponding to S110 in the foregoing method 100. For brevity, details are not described herein again.

S330: The advertisement service module in the advertisement server obtains, based on the advertisement request, the list of APPs installed by the user, and determines, based on the list of APPs installed by the user and an advertisement targeting requirement, an advertisement that satisfies a delivery condition, where the targeting requirement includes delivering an advertisement to an installed application, and/or delivering an advertisement to an uninstalled application.

For descriptions of specific steps corresponding to S330, refer to descriptions of steps corresponding to S170 in the foregoing method 100. For brevity, details are not described herein again.

S340: The advertisement service module in the advertisement server sends, to an advertisement SDK module in the terminal device, an advertisement with application installation state targeting that satisfies the delivery condition, where the advertisement includes an advertisement targeted to users who have installed an APP, and/or an advertisement targeted to users who have not installed an APP.

S350: After receiving advertisement information, the terminal device may display the advertisement information to the user.

For descriptions of specific steps corresponding to S340 and S350, refer to descriptions of corresponding steps S180 and S190 in the foregoing method 100. For brevity, details are not described herein again.

According to the advertisement obtaining method provided in this application, a user reports APPs installed on a terminal device, and an advertisement server determines, based on the APPs installed by the user and based on APP installation state targeting conditions of advertisements, an advertisement that satisfies the targeting condition, for delivery, thereby ensuring delivery accuracy of an advertisement with application installation state targeting, improving delivery efficiency of an advertisement with application installation state targeting, and improving user experience.

Figure 14:
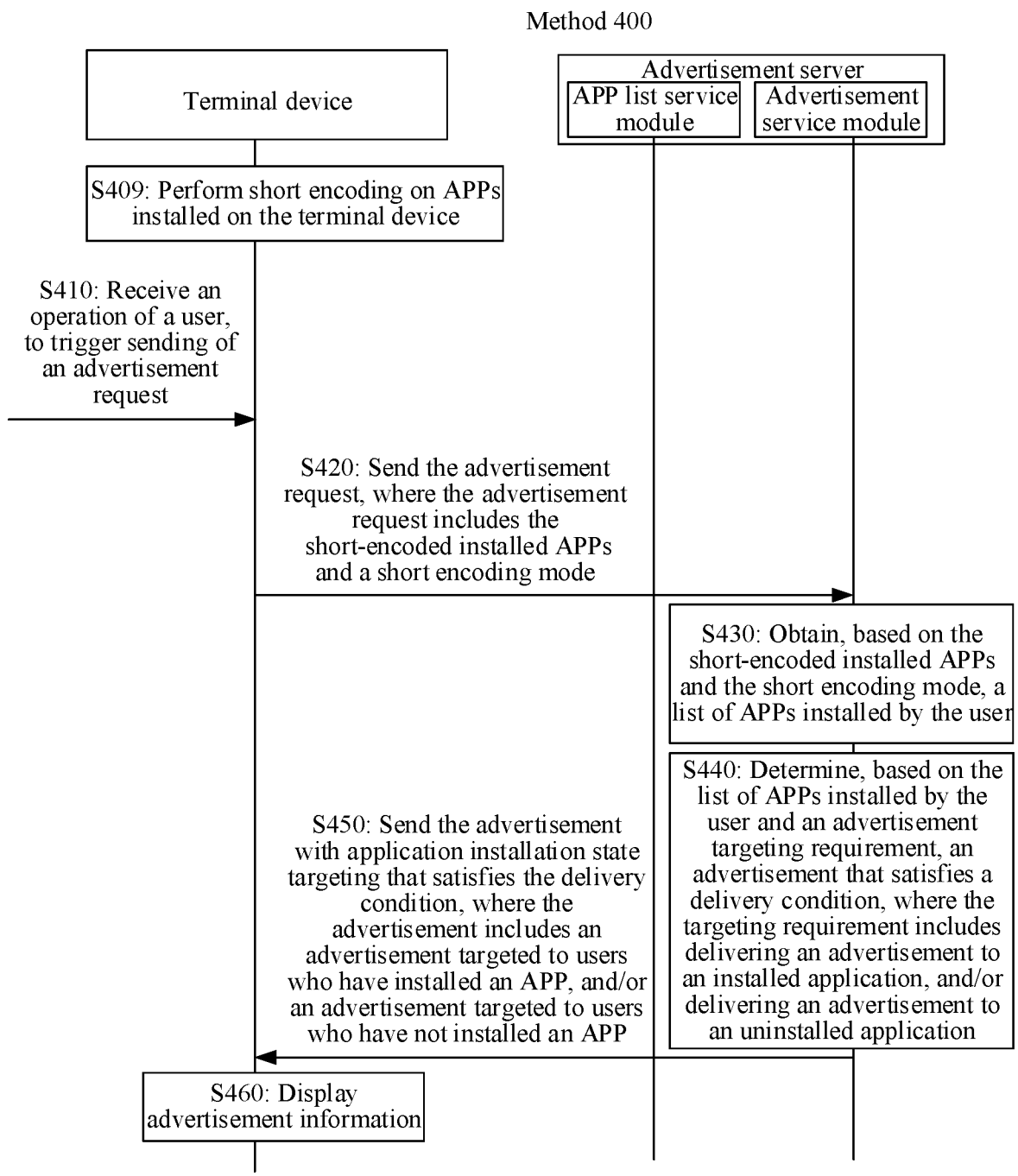
FIG. 14 is a schematic flowchart of still another example of an advertisement obtaining method according to this application.

Optionally, in embodiments of this application, as another possible implementation, as shown in FIG. 14, FIG. 14 is a schematic flowchart of another advertisement obtaining method 400 according to this application. As shown in FIG. 14, the method 400 includes S409 to S460.

S409: An advertisement SDK module in a terminal device performs short encoding on APPs installed on the terminal device.

For a mode and a process for the terminal device to perform the short encoding on the APPs, refer to the descriptions in S221 in the method 200. For brevity, details are not described herein again.

Optionally, in S409, the terminal device may perform the short encoding on the APPs installed on the terminal device each time after the terminal device is powered on, or after each detection that a new APP is downloaded and installed, or periodically (for example, every one day or two days). This is not limited herein in embodiments of this application.

S410: The terminal device receives an operation of a user, where the operation is used to trigger sending of an advertisement request.

For a specific process of S410, refer to the descriptions of S150 in the method 100. For brevity, details are not described herein again.

S420: The terminal device sends the advertisement request to an advertisement service module in an advertisement server, where the advertisement request includes the short-encoded installed APPs and a short encoding mode.

For a specific sending form of the advertisement request and an example of a specific carried parameter, refer to the descriptions in S260 in the method 220. For brevity, details are not described herein again.

S430: The advertisement module in the advertisement server obtains, based on the short-encoded installed APPs and the short encoding mode, a list of APPs installed by the user.

In S430, the advertisement service module in the advertisement server first determines a corresponding decoding mode based on a short encoding mode identifier, and then decodes, based on the decoding mode, short encoding results, to finally determine the list of APPs installed by the user.

For a specific process of S430, refer to the descriptions of S270 in the method 200. For brevity, details are not described herein again.

S440: The advertisement module in the advertisement server determines, based on the list of APPs installed by the user and an advertisement targeting requirement, an advertisement that satisfies a delivery condition, where the targeting requirement includes delivering an advertisement to an installed application, and/or delivering an advertisement to an uninstalled application.

S450: The advertisement service module in the advertisement server sends, to an advertisement SDK module in the terminal device, an advertisement with application installation state targeting that satisfies the delivery condition, where the advertisement includes an advertisement targeted to users who have installed an APP, and/or an advertisement targeted to users who have not installed an APP.

S460: After receiving advertisement information, the terminal device may display the advertisement information to the user.

For descriptions of specific steps corresponding to S440 to S460, refer to descriptions of corresponding steps in S280, S290, and S291 in the foregoing method 200. For brevity, details are not described herein again.

Optionally, before S409, the advertisement server may further negotiate with the terminal device to determine the short encoding mode and the short encoding mode identifier, so that the terminal device and the advertisement server have a consistent understanding to the short encoding mode and the short encoding mode identifier, thereby facilitating correct decoding by the advertisement server in S430.

According to the advertisement obtaining method provided in this application, short encoding is performed on APPs installed on a terminal device, and when the terminal device requests an advertisement, short encoding results and a short encoding mode are carried. An advertisement server determines, based on the short encoding results and the short encoding mode, a list of APPs installed by a user, and determines, based on an APP installation state targeting condition of each advertisement, an advertisement that satisfies the targeting condition, for delivery. In this way, regardless of whether the advertisement request sent by the user carries an advertisement tracking identifier, accuracy of application installation state targeting can be ensured, thereby ensuring delivery accuracy of an advertisement with application installation state targeting. In addition, a delay of the advertisement request of the user can also be reduced, thereby increasing an advertisement display rate, improving delivery efficiency of an advertisement with application installation state targeting, and improving user experience.

It should be understood that the foregoing descriptions are merely intended to help a person skilled in the art better understand embodiments of this application, but are not intended to limit the scope of embodiments of this application. Apparently, a person skilled in the art may make various equivalent modifications or changes based on the foregoing examples. For example, some steps in the method 100 to the method 400 may be not necessary, or some steps may be added. Alternatively, any two or more of the foregoing embodiments are combined. A modified, changed, or combined solution also falls within the scope of embodiments of this application.

It should be further understood that the parameter code in the foregoing embodiments is merely an example, and should not constitute any limitation on a format of the parameter code carried in the information in embodiments of this application. In some other embodiments of this application, the format of the parameter code carried in the information in embodiments of this application may alternatively be another format or the like. This is not limited herein in embodiments of this application.

It should be further understood that division of manners, cases, categories, and embodiments in embodiments of this application is merely intended for ease of description, and should not constitute a particular limitation. The features in the manners, categories, cases, and embodiments may be combined without contradiction.

It should be further understood that numerals used in embodiments of this application are merely distinguished for ease of description, but are not intended to limit the scope of embodiments of this application. The sequence numbers of the foregoing processes do not mean execution sequences. The execution sequences of the processes should be determined based on functions and internal logic of the processes, and should not constitute any limitation on implementation processes of embodiments of this application.

It should be further understood that the foregoing descriptions of embodiments of this application emphasize differences between embodiments. For same or similar parts that are not mentioned, refer to the embodiments. For brevity, details are not described herein again.

It should be further understood that in embodiments of this application, "predefine" may be implemented by pre-storing corresponding code, a table, or other manners used for indicating related information in a device. A specific implementation of the device is not limited in this application.

With reference to FIG. 1 to FIG. 14, the foregoing describes embodiments of the advertisement obtaining method provided in embodiments of this application. The following describes related devices provided in embodiments of this application.

In this embodiment, functional module division may be performed for devices (including the terminal device and the advertisement server) based on the foregoing method. For example, a device may be divided into functional modules corresponding to different functions, or two or more functions may be integrated into one processing module. The integrated module may be implemented in a form of hardware. It should be noted that, in this embodiment, the division of the modules is an example, and is merely logical function division. During an actual implementation, another division manner may be used.

It should be noted that related content of the steps in the foregoing method embodiments may be referenced to function descriptions of corresponding function modules, and details are not described herein again.

A communication apparatus (the terminal device or the advertisement server) provided in embodiments of this application is configured to perform the advertisement obtaining method. Therefore, the same effect as the foregoing implementation method can be achieved. When an integrated unit is used, the communication apparatus may include a processing module, a storage module, and a communication module. The processing module may be configured to control and manage an action of the communication apparatus. For example, the processing module may be configured to support the communication apparatus in performing steps performed by a processing unit. The storage module may be configured to support storage of program code, data, and the like. The communication module may be configured to support communications between the communication apparatus and another device.

The processing module may be a processor or a controller. The processing module may implement or execute various example logical blocks, modules, and circuits described with reference to content disclosed in this application. The processor may alternatively be a combination for implementing a computing function, for example, a combination including one or more microprocessors or a combination of a digital signal processor (digital signal processor, DSP) and a microprocessor. The storage module may be a memory. The communication module may be specifically a device that interacts with another electronic device, such as a radio frequency circuit, a Bluetooth chip, or a Wi-Fi chip.

Figure 15:
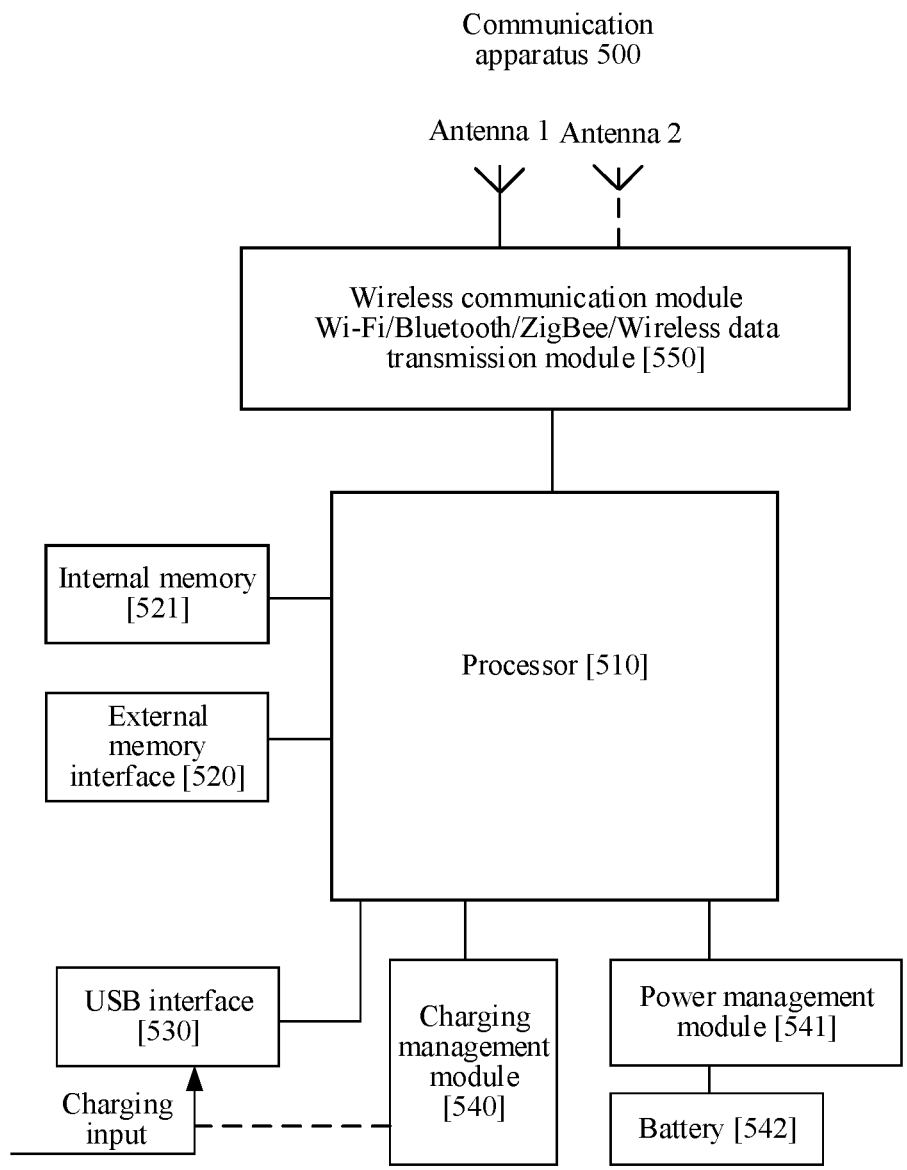
FIG. 15 is a schematic block diagram of an example of a communication structure according to an embodiment of this application.

For example, FIG. 15 is a schematic diagram of an example of a hardware structure of a communication apparatus 500 according to this application. The communication apparatus 500 may be the foregoing terminal device or advertisement server. As shown in FIG. 15, the communication apparatus 500 may include a processor 510, an external memory interface 520, an internal memory 521, a universal serial bus (universal serial bus, USB) interface 530, a charging management module 540, a power management module 541, a battery 542, an antenna 1, an antenna 2, a wireless communication module 550, and the like.

It may be understood that the structure shown in this embodiment of this application does not constitute a specific limitation on the communication apparatus 500. In some other embodiments of this application, the communication apparatus 500 may include more or fewer components than those shown in the figure, or combine some components, or split some components, or different component arrangements. The components shown in the figure may be implemented by hardware, software, or a combination of software and hardware.

For example, when the communication apparatus 500 is a terminal device, the communication apparatus may further include a display screen.

The processor 510 may include one or more processing units. For example, the processor 510 may include an application processor (application processor, AP), a modem processor, a graphics processor (graphics processing unit, GPU), an image signal processor (image signal processor, ISP), a controller, a video codec, a digital signal processor (digital signal processor, DSP), a baseband processor, and/or a neural network processing unit (neural network processing unit, NPU), or the like. Different processing units may be independent components, or may be integrated into one or more processors. In some embodiments, the communication apparatus 500 may alternatively include one or more processors 510. The controller may generate an operation control signal based on instruction operation code and a time sequence signal, to complete control on instruction obtaining and instruction execution.

In some embodiments, the processor 510 may include one or more interfaces. The interfaces may include an inter-integrated circuit (inter-integrated circuit, I2C) interface, an integrated circuit sound (integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a SIM card interface, and/or a USB interface, or the like. The USB interface 530 is an interface that conforms to a USB standard specification, and may be specifically a mini USB interface, a micro USB interface, a USB Type C interface, or the like. The USB interface 2530 may be configured to connect to a charger to charge the communication apparatus 500, or may be configured to communicate data between the communication apparatus 500 and a peripheral device.

It may be understood that an interface connection relationship between the modules shown in this embodiment of this application is merely an example for description, and does not constitute a limitation on the structure of the communication apparatus 500. In some other embodiments of this application, the communication apparatus 500 may alternatively use different interface connection manners or a combination of a plurality of interface connection manners in the foregoing embodiments.

A wireless communication function of the communication apparatus 500 may be implemented by using the antenna 1, the antenna 2, the wireless communication module 550, and the like.

The wireless communication module 550 may provide a wireless communication solution that is applied to the communication apparatus 500 and that includes Wi-Fi (including Wi-Fi awareness and Wi-Fi AP), Bluetooth (Bluetooth, BT), and a wireless data transmission module (for example, 433 MHz, 868 MHz, and 515 MHz). The wireless communication module 550 may be one or more components integrating at least one communication processing module. The wireless communication module 550 receives an electromagnetic wave by using the antenna 1 or the antenna 2 (or the antenna 1 and the antenna 2), performs filtering and frequency modulation processing on an electromagnetic wave signal, and sends a processed signal to the processor 510. The wireless communication module 550 may further receive a to-be-sent signal from the processor 510, perform frequency modulation and amplification on the signal, and convert the signal into an electromagnetic wave through the antenna 1 or the antenna 2 for radiation.

The external memory interface 520 may be configured to connect to an external memory card, for example, a Micro SD card, to extend a storage capability of the communication apparatus 500. The external storage card communicates with the processor 510 through the external memory interface 520, to implement a data storage function. For example, files such as music and videos are stored in the external storage card.

The internal memory 521 may be configured to store one or more computer programs. The one or more computer programs include instructions. The processor 510 may run the instructions stored in the internal memory 521, so that the communication apparatus 500 performs the advertisement obtaining method provided in some embodiments of this application, various applications, data processing, and the like. The internal memory 521 may include a code storage area and a data storage area. The code storage area may store an operating system. The data storage area may store data created during use of the communication apparatus 500, and the like. In addition, the internal memory 521 may include a high-speed random access memory, and may further include a non-volatile memory, for example, one or more magnetic disk storage components, a flash component, or a universal flash storage (universal flash storage, UFS). In some embodiments, the processor 510 may run the instructions stored in the internal memory 521 and/or the instructions stored in the memory that is disposed in the processor 510, to enable the communication apparatus 500 to perform the advertisement obtaining method provided in embodiments of this application, other applications, and data processing.

It should be understood that, for a specific process in which the communication apparatus 500 performs the foregoing corresponding steps, refer to the foregoing related descriptions of the steps performed by the terminal device or the advertisement server in embodiments in FIG. 5, FIG. 12A and FIG. 12B, FIG. 13, and FIG. 14. For brevity, details are not described herein again.

Figure 16:
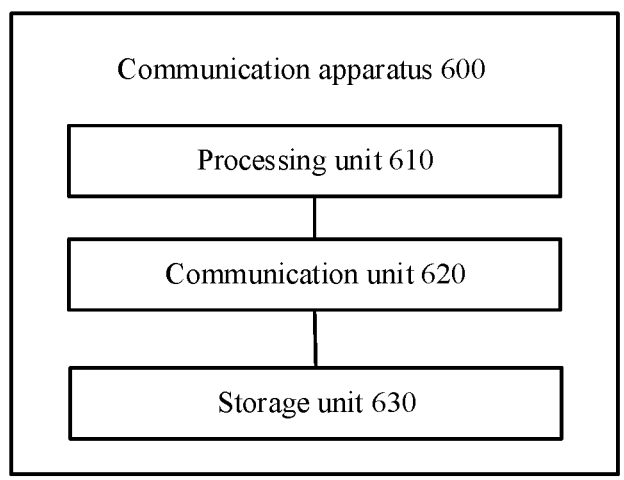
FIG. 16 is a schematic block diagram of an example of a communication apparatus structure according to an embodiment of this application.

FIG. 16 is a schematic block diagram of another communication apparatus 600 according to an embodiment of this application. The communication apparatus 600 may correspond to the terminal device or the advertisement server described in embodiments of the method 100 to the method 400. Alternatively, the communication apparatus 600 may be a chip or a component applied to the terminal device or the advertisement server. In addition, modules or units in the communication apparatus 600 are configured to perform actions or processing processes performed by the terminal device or the advertisement server described in embodiments of the method 100 to the method 400 respectively. As shown in FIG. 16, the communication apparatus 600 may include a processing unit 610 and a communication unit 620. Optionally, the communication apparatus 600 may further include a storage unit 630.

It should be understood that, for a specific process of performing the foregoing corresponding steps by the units in the communication apparatus 600, refer to related descriptions of the steps performed by the terminal device or the advertisement server in embodiments in FIG. 5, FIG. 12A and FIG. 12B, FIG. 13, and FIG. 14. For brevity, details are not described herein again.

Optionally, the communication unit 620 may include a receiving unit (module) and a sending unit (module), configured to perform steps of receiving information and sending information by the terminal device or the advertisement server in the foregoing method embodiments. The storage unit 1300 is configured to store instructions executed by the processing unit 610 and the communication unit 620. The processing unit 610, the communication unit 620, and the storage unit 630 are communicatively connected. The storage unit 630 stores the instructions. The processing unit 610 is configured to execute the instructions stored in the storage unit. The communication unit 620 is configured to send or receive a specific signal under driving of the processing unit 610.

It should be understood that the communication unit 620 may be a transceiver, an input/output interface, an interface circuit, or the like. For example, the communication unit may be implemented by the wireless communication module 550 in the embodiment shown in FIG. 15. The storage unit may be a memory. For example, the storage unit may be implemented by the external memory interface 520 and the internal memory 521 in the embodiment shown in FIG. 15. The processing unit 610 may be implemented by the processor 510 in the embodiment shown in FIG. 15, or may be implemented by the processor 510, the external memory interface 520, and the internal memory 521.

It should be further understood that the communication apparatus 600 shown in FIG. 16 may be a terminal device or an advertisement server, or the terminal device or the advertisement server may include the communication apparatus 600 shown in FIG. 16.

It should be further understood that division of units in the apparatus is merely logical function division. During an actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form in which the processing element invokes software. In an example, a unit in any one of the foregoing apparatuses may be one or more integrated circuits configured to implement the foregoing method, for example, one or more application-specific integrated circuits (application-specific integrated circuits, ASICs), one or more digital signal processors (digital signal processors, DSPs), one or more field programmable gate arrays (field programmable gate arrays, FPGAs), or a combination of at least two of these integrated circuit forms. For another example, when the units in the apparatus may be implemented in a form of scheduling a program by the processing element, the processing element may be a general-purpose processor, for example, a central processing unit (central processing unit, CPU) or another processor that can invoke the program. For still another example, the units may be integrated and implemented in a form of a system-on-a-chip (system-on-a-chip, SOC).

An embodiment of this application further provides an advertisement system. The system includes the terminal device and the advertisement server provided in the foregoing method embodiments. Optionally, the system may further include at least one of a second hub device, a third electronic device, and a fourth electronic device provided in the foregoing method embodiments.

An embodiment of this application further provides a computer-readable storage medium, configured to store computer program code. The computer program includes instructions used to perform any advertisement obtaining method provided in the foregoing embodiments of this application. The readable medium may be a read-only memory (read-only memory, ROM) or a random access memory (random access memory, RAM). This is not limited in this embodiment of this application.

This application further provides a computer program product. The computer program product includes instructions. When the instructions are executed, the terminal device and the advertisement server are enabled to perform corresponding operations in the foregoing methods.

An embodiment of this application further provides a chip located in a communication apparatus. The chip includes a processing unit and a communication unit. The processing unit may be, for example, a processor, and the communication unit may be, for example, an input/output interface, a pin, or a circuit. The processing unit may execute computer instructions, so that the communication apparatus performs any advertisement obtaining method provided in the foregoing embodiments of this application.

Optionally, the computer instructions are stored in a storage unit.

Optionally, the storage unit is a storage unit in the chip, for example, a register or a cache. Alternatively, the storage unit may be a storage unit that is in the terminal and that is located outside the chip, for example, a ROM, other types of static storage devices that can store static information and instructions, or a random RAM. Any processor mentioned above may be a CPU, a microprocessor, an ASIC, or one or more integrated circuits configured to control program execution of the feedback information transmission method. The processing unit and the storage unit may be decoupled, are disposed on different physical devices respectively, and are connected in a wired or wireless manner to implement respective functions of the processing unit and the storage unit, to support the system chip in implementing various functions in the foregoing embodiments. Alternatively, the processing unit and the memory may be coupled to the same device.

The communication apparatus, the computer-readable storage medium, the computer program product, and the chip provided in embodiments are all configured to perform the corresponding methods provided above. Therefore, for beneficial effects that can be achieved by the communication apparatus, the computer-readable storage medium, the computer program product, and the chip, refer to the beneficial effects of the corresponding methods provided above. Details are not described herein again.

It may be understood that the memory in this embodiment of this application may be a volatile memory or a non-volatile memory, or may include both the volatile memory and the non-volatile memory. The non-volatile memory may be a ROM, a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a RAM that serves as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In this application, names may be assigned to various objects such as messages/information/devices/network elements/systems/apparatuses/actions/operations/procedures/concepts. It can be understood that the specific names do not constitute a limitation on the related objects. The assigned names may vary with factors such as scenarios, contexts, or usage habits. Understanding of technical meanings of technical terms in this application should be determined mainly based on functions and technical effects embodied/performed by the technical terms in the technical solutions.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

All or some of the methods in embodiments of this application may be implemented by software, hardware, firmware, or any combination thereof. When software is used to implement embodiments, all or some of embodiments may be implemented in a form of a computer program product. The computer program product includes one or more computer programs and instructions. When the computer programs or instructions are loaded and executed on a computer, all or some of procedures or functions in embodiments of this application are executed. The computer may be a general-purpose computer, a dedicated computer, a computer network, or another programmable apparatus. The computer programs or the instructions may be stored in a computer-readable storage medium, or may be communicated through the computer-readable storage medium. The computer-readable storage medium may be any usable medium accessible by a computer, or a data storage device such as a server integrating one or more usable media.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a readable storage medium, and includes several instructions for instructing a computer device (which may be a personal computer, a server, or a network device, or the like) to perform all or some of the steps of the methods described in embodiments of this application. The foregoing readable storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the scope of protection of this application. Any variation or replacement readily figured out by a person skilled in the art within the technical scope disclosed in this application shall fall within the scope of protection of this application. Therefore, the scope of protection of this application shall be subject to the scope of protection of the claims.

What is claimed is:

1. A method, comprising:
sending, by a terminal device, a query request to an advertisement server, wherein the query request comprises a list of applications installed on the terminal device;
receiving, by the terminal device in response to the query request, query response information sent by the advertisement server, wherein the query response information comprises a short-encoding mode identifier and a short-encoded result comprising a short-encoded representation of an intersection between applications stored on the advertisement server and an application set comprising the applications installed on the terminal device based on the list of the applications of the query request;
sending, by the terminal device, an advertisement request to the advertisement server, wherein the advertisement request comprises the short-encoding mode identifier and the short-encoded representation, the short-encoded mode identifier and the short-encoded representation correspond to at least one application package name, the advertisement request does not include any unencoded application package names, the short-encoded mode identifier and the short-encoded representation are the only information in the advertisement request that correspond to the at least one application package name, and the short-encoded mode identifier is configured to be used by the advertisement server to determine a decoding mode to decode the short-encoded result;

decoding, by the advertisement server, the short-encoded result of the advertisement request based on the decoding mode determined based on the short-encoding mode identifier of the advertisement request to obtain the application set;

receiving, by the terminal device, advertisement information sent by the advertisement server in response to the advertisement request, wherein the advertisement information comprises first advertisement information or second advertisement information, the first advertisement information is associated with a first application, the application set comprises the first application, the second advertisement information indicates the terminal device to install a second application, the application set does not comprise the second application, and the application set is based on the decoded short-encoded result; and displaying, by the terminal device, the advertisement information.

2. The method according to claim 1, wherein the applications stored on the advertisement server are associated with advertisements to be delivered by the advertisement server.

3. The method according to claim 1, wherein:

the first advertisement information comprises a download address of a first advertisement material, a package name of the first application, and an address link of a first page, and the first page is a page of the first application; or the second advertisement information comprises a download address of a second advertisement material and a package name of the second application.

4. The method according to claim 3, wherein the method further comprises:

displaying, by the terminal device, a first interface, wherein the first interface comprises the first advertisement material;

detecting, by the terminal device, a first operation performed on a first advertisement; and displaying, by the terminal device, the first page in the first application when the first operation is detected.

5. The method according to claim 3, wherein the method further comprises:

displaying, by the terminal device, a second interface, wherein the second interface comprises the second advertisement material;

detecting, by the terminal device, a second operation performed on a second advertisement; and displaying, by the terminal device, a download page of the second application when the second operation is detected.

6. The method according to claim 1, further comprising, before sending, by the terminal device, the advertisement request to the advertisement server:

receiving, by the terminal device, a third operation of a user, wherein the third operation is used to trigger the terminal device to send the advertisement request, and the third operation comprises an operation of opening an application or an operation of tapping a link in the application.

7. A system, comprising:

at least one processor;

at least one memory coupled to the at least one processor with instructions stored thereon, wherein the instructions, when executed by the at least one processor, enable the system to perform:

sending a query request to an advertisement server, wherein the query request comprises a list of applications installed on a terminal device;

receiving query response information sent by the advertisement server in response to the query request, wherein the query response information comprises a short-encoding mode identifier and a short-encoded result comprising a short-encoded representation of an intersection between applications stored on the advertisement server and an application set comprising the applications installed on the terminal device based on the list of applications of the query request;

sending an advertisement request to the advertisement server, wherein the advertisement request comprises the short-encoding mode identifier and the short-encoded representation, wherein the short-encoded mode identifier and the short-encoded representation correspond to at least one application package name, the advertisement request does not include any unencoded application package names, the short-encoded mode identifier and the short-encoded representation are the only information in the advertisement request that correspond to the at least one application package name, and the short-encoded mode identifier is configured to be used by the advertisement server to determine a decoding mode to decode the short-encoded result;

decoding, by the advertisement server, the short-encoded result of the advertisement request based on the decoding mode determined based on the short-encoding mode identifier of the advertisement request to obtain the application set:

receiving advertisement information sent by the advertisement server in response to the advertisement request, wherein the advertisement information comprises first advertisement information or second advertisement information, the first advertisement information is associated with a first application, the application set comprises the first application, the second advertisement information indicates the terminal device to install a second application, and the application set does not comprise the second application, and the application set is based on the decoded short-encoded result; and displaying the advertisement information.

8. The system according to claim 7, wherein the applications stored on the advertisement server are associated with advertisements to be delivered by the advertisement server.

9. The system according to claim 7, wherein:

the first advertisement information comprises a download address of a first advertisement material, a package name of the first application, and an address link of a first page, and the first page is a page of the first application; or the second advertisement information comprises a download address of a second advertisement material and a package name of the second application.

10. The system according to claim 9, wherein the instructions, when executed by the at least one processor, further enable the system to perform:

displaying a first interface, wherein the first interface comprises the first advertisement material;

detecting a first operation performed on a first advertisement; and displaying the first page in the first application when the first operation is detected.

11. The system according to claim 9, wherein the instructions, when executed by the at least one processor, further enable the system to perform:
   displaying a second interface, wherein the second interface comprises the second advertisement material;
   detecting a second operation performed on a second advertisement; and
   displaying a download page of the second application when the second operation is detected.

12. The system according to claim 7, wherein the instructions, when executed by the at least one processor, further enable the system to perform:
   before sending the advertisement request to the advertisement server, receiving a third operation of a user, wherein the third operation is used to trigger the terminal device to send the advertisement request, and the third operation comprises an operation of opening an application or an operation of tapping a link in the application.

13. An advertisement server, comprising:
   at least one processor; and
   a memory with instructions stored thereon, wherein the instructions, when executed by the at least one processor, enable the advertisement server to perform:
   receiving a query request from a terminal device, wherein the query request comprises a list of applications installed on the terminal device;
   determining an intersection between applications stored on the advertisement server and an application set comprising the applications installed on the terminal device;
   short-encoding the intersection between the applications stored on the advertisement server and the application set comprising the applications installed on the terminal device according to an encoding mode to produce a short-encoded mode identifier corresponding to the encoding mode and a short-encoded result comprising a short-encoded representation of the intersection between the applications stored on the advertisement server and the application set comprising the applications installed on the terminal device;
   sending, in response to the query request, query response information comprising the short-encoded result and the short-encoded mode identifier to the terminal device;
   receiving an advertisement request from the terminal device, wherein the advertisement request comprises the short-encoding mode identifier and the short-encoded representation, wherein the short-encoded mode identifier and the short-encoded representation correspond to application names of the application set, the advertisement request does not include any unencoded application package names, the short-encoded mode identifier and the short-encoded representation are the only information in the advertisement request that correspond to the application names of the application set, and the short-encoded mode identifier is configured to be used by the advertisement server to determine a decoding mode to decode the short-encoded result;
   determining, based on the short-encoding mode identifier of the advertisement request, the decoding mode;
   decoding the short-encoded result of the advertisement request based on the decoding mode determined based on the short-encoding mode identifier of the advertisement request to obtain the application set;
   determining, based on the decoded short-encoded result of the advertisement request and an advertisement with application installation targeting, an advertisement that satisfies a delivery condition, wherein the advertisement with the application installation targeting comprises an advertisement targeted to users who have installed an application, or an advertisement targeted to users who have not installed the application; and
   sending advertisement information to the terminal device to be displayed by the terminal device in response to the advertisement request, wherein the advertisement information comprises first advertisement information or second advertisement information, the first advertisement information is associated with a first application, the application set comprises the first application, the second advertisement information indicates to the terminal device to install a second application, and the application set does not comprise the second application.

14. The advertisement server according to claim 13, wherein the instructions, when executed by the at least one processor, further enable the advertisement server to perform, before receiving the advertisement request from the terminal device:
   determining the short-encoded representation based on the applications installed on the terminal device and the applications stored on the advertisement server; and
   sending, by the advertisement server, the query response information to the terminal device.

15. The advertisement server according to claim 14, wherein determining the short-encoded representation comprises:
   performing short-encoding on each application package name comprised in the application set, to obtain the short-encoded result that corresponds to each application package name of application package names of the application set.

16. The advertisement server according to claim 13, wherein:
   the applications stored on the advertisement server are associated with advertisements to be delivered by the advertisement server.

17. The advertisement server according to claim 13, wherein:
   the first advertisement information comprises a download address of first advertisement material, a package name of the first application, and an address link of a first page, and the first page is a page of the first application; or
   the second advertisement information comprises a download address of a second advertisement material and a package name of the second application.

18. The advertisement server according to claim 13, wherein the instructions, when executed by the at least one processor, further enable the advertisement server to perform, before receiving the advertisement request from the terminal device:
   sending a third operation of a user, wherein the third operation is used to trigger the terminal device to send the advertisement request, and the third operation comprises an operation of opening an application or an operation of tapping a link in the application.

* * * * *